(12) United States Patent
Chaen et al.

(10) Patent No.: US 10,688,448 B2
(45) Date of Patent: Jun. 23, 2020

(54) POROUS BODY, POLYMER ELECTROLYTE MEMBRANE, FILTER MATERIAL FOR FILTER, AND FILTER UNIT

(71) Applicant: DAIKIN INDUSTRIES, LTD., Osaka-Shi, Osaka (JP)

(72) Inventors: Shinichi Chaen, Settsu (JP); Taku Yamanaka, Settsu (JP); Kohei Yasuda, Settsu (JP); Masahiko Yamada, Settsu (JP); Nobuki Uraoka, Settsu (JP); Tomohisa Konishi, Settsu (JP); Kunihiko Inui, Settsu (JP); Yoshiyuki Shibuya, Settsu (JP); Makoto Ono, Settsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 151 days.

(21) Appl. No.: 15/100,002

(22) PCT Filed: Dec. 1, 2014

(86) PCT No.: PCT/JP2014/081775
§ 371 (c)(1),
(2) Date: May 27, 2016

(87) PCT Pub. No.: WO2015/080290
PCT Pub. Date: Jun. 4, 2015

(65) Prior Publication Data
US 2017/0001155 A1    Jan. 5, 2017

(30) Foreign Application Priority Data
Nov. 29, 2013   (JP) ................................ 2013-248707

(51) Int. Cl.
*B01D 71/36*     (2006.01)
*B01D 69/02*     (2006.01)
(Continued)

(52) U.S. Cl.
CPC ......... *B01D 71/36* (2013.01); *B01D 39/1692* (2013.01); *B01D 69/02* (2013.01);
(Continued)

(58) Field of Classification Search
CPC   B01D 2325/02; B01D 39/1692; B01D 69/02; B01D 69/08; B01D 69/081;
(Continued)

(56) References Cited

U.S. PATENT DOCUMENTS

| 5,234,739 A | 8/1993 | Tanaru et al. |
| 5,547,551 A | 8/1996 | Bahar et al. |

(Continued)

FOREIGN PATENT DOCUMENTS

| CN | 1072351 A  | 5/1993 |
| CN | 1033428 C  | 12/1996 |

(Continued)

OTHER PUBLICATIONS

Communication dated Aug. 11, 2017, issued by the United States Patent and Trademark Office in co-pending U.S. Appl. No. 15/100,010.
(Continued)

*Primary Examiner* — Dirk R Bass
(74) *Attorney, Agent, or Firm* — Sughrue Mion, PLLC

(57) ABSTRACT

The present invention provides a porous body having high strength, a small pore size, and excellent homogeneity. The porous body of the present invention includes polytetrafluoroethylene and has a microstructure that includes nodes and fibrils. The microstructure further includes, in addition to the nodes and the fibrils, fused points where a fibril that links two nodes and another fibril that links another two nodes are fused with each other.

11 Claims, 7 Drawing Sheets

(51) Int. Cl.
*H01M 8/1039* (2016.01)
*B01D 69/08* (2006.01)
*C08J 5/22* (2006.01)
*B01J 20/26* (2006.01)
*B01D 39/16* (2006.01)
*H01M 8/1018* (2016.01)

(52) U.S. Cl.
CPC ........... *B01D 69/08* (2013.01); *B01D 69/081* (2013.01); *B01J 20/261* (2013.01); *C08J 5/2237* (2013.01); *H01M 8/1039* (2013.01); *B01D 2325/02* (2013.01); *C08J 2327/18* (2013.01); *H01M 2008/1095* (2013.01)

(58) Field of Classification Search
CPC ........ B01D 71/00; B01D 71/36; B01J 20/261; C08J 2327/18; C08J 5/2237; C08J 9/00; H01M 2008/1095; H01M 8/1039
See application file for complete search history.

(56) References Cited

U.S. PATENT DOCUMENTS

| | | |
|---|---|---|
| 5,795,668 A | 8/1998 | Banerjee |
| 5,945,192 A | 8/1999 | Kato et al. |
| 6,054,230 A | 4/2000 | Kato |
| 6,177,533 B1 | 1/2001 | Woodward |
| 6,541,589 B1 | 4/2003 | Baillie |
| 7,670,720 B1 | 3/2010 | Buerger et al. |
| 2002/0071980 A1 | 6/2002 | Tabata et al. |
| 2002/0161149 A1 | 10/2002 | Kobayashi et al. |
| 2003/0008198 A1 | 1/2003 | Mukoyama et al. |
| 2005/0025684 A1* | 2/2005 | Jethrow .................. A61L 2/022 422/292 |
| 2005/0186461 A1 | 8/2005 | Hommura et al. |
| 2006/0068258 A1 | 3/2006 | Kinoshita |
| 2007/0009727 A1 | 1/2007 | Sawada et al. |
| 2007/0135558 A1 | 6/2007 | Tsuda et al. |
| 2008/0083499 A1 | 4/2008 | Nodono |
| 2008/0200571 A1 | 8/2008 | Higuchi et al. |
| 2009/0234032 A1 | 9/2009 | Kimishima |
| 2009/0246592 A1 | 10/2009 | Kinoshita |
| 2009/0281231 A1 | 11/2009 | Kasai et al. |
| 2010/0160510 A1 | 6/2010 | Aten et al. |
| 2011/0008708 A1 | 1/2011 | Akita et al. |
| 2011/0020728 A1 | 1/2011 | Kita et al. |
| 2011/0027688 A1 | 2/2011 | Hommura et al. |
| 2011/0039960 A1 | 2/2011 | Xu et al. |
| 2011/0040054 A1 | 2/2011 | Higuchi et al. |
| 2012/0028046 A1 | 2/2012 | Ono et al. |
| 2013/0040142 A1 | 2/2013 | Frey et al. |
| 2013/0172477 A1 | 7/2013 | Hintzer et al. |
| 2013/0183515 A1 | 7/2013 | White |
| 2013/0267621 A1 | 10/2013 | Sawada et al. |
| 2013/0281558 A1 | 10/2013 | Sawada et al. |
| 2014/0200310 A1 | 7/2014 | Taira et al. |
| 2014/0343239 A1 | 11/2014 | Higuchi et al. |
| 2015/0082757 A1 | 3/2015 | Chaen et al. |
| 2015/0299341 A1 | 10/2015 | Nanba |
| 2016/0289361 A1 | 10/2016 | Yamanaka et al. |
| 2017/0002156 A1 | 1/2017 | Chaen et al. |
| 2017/0005354 A1 | 1/2017 | Inoue et al. |
| 2017/0012313 A1 | 1/2017 | Inoue et al. |

FOREIGN PATENT DOCUMENTS

| | | |
|---|---|---|
| CN | 1351088 A | 5/2002 |
| CN | 1685548 A | 10/2005 |
| CN | 101771153 A | 7/2010 |
| CN | 104884476 A | 9/2015 |
| EP | 0 661 336 A1 | 7/1995 |
| EP | 1 560 284 A1 | 8/2005 |
| EP | 3 061 512 A1 | 8/2016 |
| JP | 5-202217 A | 8/1993 |
| JP | 8-162132 A | 6/1996 |
| JP | 11-501961 A | 2/1999 |
| JP | 11-240917 A | 9/1999 |
| JP | 2000-143727 A | 5/2000 |
| JP | 2002-201217 A | 7/2002 |
| JP | 3552686 B2 | 8/2004 |
| JP | 2005-520002 A | 7/2005 |
| JP | 2006-49002 A | 2/2006 |
| JP | 2006-504848 A | 2/2006 |
| JP | 2007/005361 A1 | 1/2007 |
| JP | 2008-512551 A | 4/2008 |
| JP | 4402625 B2 | 1/2010 |
| JP | 2010-58026 A | 3/2010 |
| JP | 4951970 B2 | 6/2012 |
| WO | 96/28242 A1 | 9/1996 |
| WO | 96/28501 A1 | 9/1996 |
| WO | 03/022912 A2 | 3/2003 |
| WO | 03/033555 A1 | 4/2003 |
| WO | 2004/041529 A1 | 5/2004 |
| WO | 2005/042593 A1 | 5/2005 |
| WO | 2005/061567 A1 | 7/2005 |
| WO | 2006/031456 A1 | 3/2006 |
| WO | 2007/005361 A1 | 1/2007 |
| WO | 2007/011492 A1 | 1/2007 |
| WO | 2007/024762 A2 | 3/2007 |
| WO | 2007/046345 A1 | 4/2007 |
| WO | 2007/069714 A1 | 6/2007 |
| WO | 2009/001894 A1 | 12/2008 |
| WO | 2009/116446 A1 | 9/2009 |
| WO | 2009/142080 A1 | 11/2009 |
| WO | 2010076661 A1 | 7/2010 |
| WO | 2010/098135 A1 | 9/2010 |
| WO | 2010/110851 A2 | 9/2010 |
| WO | 2010/113950 A1 | 10/2010 |
| WO | 2012/033804 A1 | 3/2012 |
| WO | 2013/027850 A1 | 2/2013 |
| WO | 2013/115278 A1 | 8/2013 |
| WO | 2013/157647 A1 | 10/2013 |

OTHER PUBLICATIONS

Communication dated Jan. 23, 2018 from the U.S. Patent and Trademark Office in counterpart U.S. Appl. No. 15/038,307.
Final Office Action dated Apr. 19, 2018 from the United States Patent and Trademark Office in related U.S. Appl. No. 15/100,010.
Office Action dated Apr. 10, 2018, which issued during the prosecution of U.S. Appl. No. 15/100,048.
International Search Report dated Mar. 3, 2015 from the International Searching Authority in counterpart International Application No. PCT/JP2014/081795.
International Search Report dated Feb. 24, 2015 from the International Searching Authority in counterpart International Application No. PCT/JP2014/081779.
International Search Report dated Mar. 3, 2015 from the International Searching Authority in counterpart International Application No. PCT/JP2014/081771.
International Search Report dated Mar. 10, 2015 from the International Searching Authority in counterpart International Application No. PCT/JP2014/081777.
International Preliminary Report on Patentability dated Jun. 28, 2016 from the International Bureau in counterpart International Application No. PCT/JP2014/081795.
International Preliminary Report on Patentability dated May 31, 2016 from the International Bureau in counterpart International Application No. PCT/JP2014/081779.
International Preliminary Report on Patentability dated May 31, 2016 from the International Bureau in counterpart International Application No. PCT/JP2014/081771.
International Preliminary Report on Patentability dated May 31, 2016 from the International Bureau in counterpart International Application No. PCT/JP2014/081775.
International Preliminary Report on Patentability dated May 31, 2016 from the International Bureau in counterpart International Application No. PCT/JP2014/081777.

(56) References Cited

OTHER PUBLICATIONS

Communication dated Apr. 7, 2017, from the European Patent Office in counterpart European Application No. 14865872.7.
Database WPI, Week 200572; Thomas Scientific, London, GB, XP-002768565 & WO 2005/090480 (4 pages total) Sep. 29, 2005.
Communication dated Apr. 19, 2017, from the European Patent Office in counterpart European Application No. 14865651.5.
International Search Report for PCT/JP2014/081775 dated Mar. 10, 2015 [PCT/ISA/210].
Communication dated May 22, 2017 from the European Patent Office in counterpart Application No. 14866220.8.
Communication dated May 24, 2017 from the European Patent Office in counterpart Application No. 14865899.0.
Communication dated Jun. 2, 2017 from the European Patent Office in counterpart Application No. 14865549.1.
Hongwei Zhang, et al.; "Recent Development of Polymer Electrolyte Membranes for Fuel Cells"; Chemical Reviews; vol. 112, No. 5, May 9, 2012; pp. 2780-2832; XP055375431.
Pattabiraman Krishnamurthy et al.; "Performance of a 1kW Class Nafion-PTFE Composite Membrane Fuel Stack"; International Journal of Chemical Engineering, vol. 2012, Article ID 512803; pp. 1-8.
Michael Wikol et al.; "Expanded Polytetrafluoroethylene Membranes and Their Applications"; Extracted from Filtration and Purification in the Biopharmaceutical Industry, Second Edition; W.L. Gore & Associates, Inc.; Chapter 23, pp. 619-640 (Feb. 2008).
Xinmin Hao et al.; "Studies on Porous and Morphological Structures of Expanded PTFE Membrane Through Biaxial Stretching Technique"; INJ Summer 2005; pp. 31-38.
Communication dated Nov. 27, 2017 from the United States Patent and Trademark Office in counterpart U.S. Appl. No. 15/100,048.
Communication dated Nov. 29, 2018, from United States Patent and Trademark Office in related U.S. Appl. No. 15/100,048.
Communication dated Nov. 16, 2018, from United States Patent and Trademark Office in related U.S. Appl. No. 15/100,010.
Office Action dated May 15, 2018, which issued during the prosecution of U.S. Appl. No. 15/038,307.
Communication dated Dec. 17, 2018 from the United States Patent and Trademark Office in U.S. Appl. No. 15/038,307.
Communication dated May 30, 2019 from the United States Patent and Trademark Office in U.S. Appl. No. 15/100,010.
Communication dated Jan. 31, 2019 from the United States Patent and Trademark Office in U.S. Appl. No. 15/100,013.
Communication dated May 1, 2019 from the United States Patent and Trademark Office in Counterpart U.S. Appl. No. 15/100,048.
Communication dated Oct. 17, 2019 from the United States Patent and Trademark Office in Counterpart U.S. Appl. No. 15/100,013.
Communication dated Oct. 18, 2019 from the United States Patent and Trademark Office in Counterpart U.S. Appl. No. 15/100,048.
Office Action dated Jan. 31, 2020 in U.S. Appl. No. 15/100,048.
Communication dated Jul. 10, 2019 from the United States Patent and Trademark Office of co-pending U.S. Appl. No. 15/100,013.
Communication dated Jul. 16, 2019 from the United States Patent and Trademark Office of co-pending U.S. Appl. No. 15/038,307.
Notice of Allowance dated Nov. 19, 2019, issued in U.S. Appl. No. 15/100,010.
Office Action dated Dec. 4, 2019 issued in U.S. Appl. No. 15/038,307.

\* cited by examiner

POROUS BODY, POLYMER ELECTROLYTE MEMBRANE, FILTER MATERIAL FOR FILTER, AND FILTER UNIT

CROSS REFERENCE TO RELATED APPLICATIONS

This application is a National Stage of International Application No. PCT/JP2014/081775, filed on Dec. 1, 2014, which claims priority from Japanese Patent Application No. 2013-248707, filed on Nov. 29, 2013, the contents of all of which are incorporated herein by reference in their entirety.

TECHNICAL FIELD

The present invention relates to porous bodies, polymer electrolyte membranes, filter materials for filters, and filter units.

BACKGROUND ART

It is known in the field that a high-porosity porous body can be obtained by stretching a molded article produced by paste extrusion molding polytetrafluoroethylene fine powder. This polytetrafluoroethylene porous body consists of nodes (knots) and fibrils (fibers) and allows gas such as water vapor to pass therethrough, but does not allow water drops to pass therethrough owing to strong water repellency of polytetrafluoroethylene. This stretched porous body can be used as a sealing material without being sintered, or can be used in clothes or separation membranes after being sintered and formed into a tough, continuously stretched sheet or tube.

In particular, biaxially stretched porous membranes (biaxially stretched membranes) have been conventionally used in a wide variety of fields such as microfiltration membranes for gas and liquid (including liquid chemical), materials for covering electric wires, and breather valves.

Biaxially stretched polytetrafluoroethylene membranes are usually thin (100 μm or smaller, in general), and are likely to be broken during stretching steps, a taking-up step after the stretching, and post-steps such as lamination. Such membranes are also likely to be broken when used in clothes or separation membranes. Thus, these biaxially stretched membranes have problems in durability and reliability.

In order to produce a biaxially stretched polytetrafluoroethylene film having high strength, the following production methods are proposed.

For example, Patent Literature 1 and Patent Literature 2 disclose a manufacturing method for a porous film including stretching an paste extrudate containing an extrusion aid in a transverse direction, drying the aid, stretching the workpiece in the extrusion direction (machine direction) at least once, and further stretching the workpiece in the transverse direction.

Patent Literature 3 discloses a manufacturing method for a porous film including biaxially stretching a semi-sintered PTFE in the machine direction and then in the transverse direction, and heat-setting the biaxially stretched PTFE at a temperature not lower than the melting point of the sintered PTFE.

PTFE fine powder that can provide a highly strong porous body is also proposed.

For example, Patent Literature documents 4 and 5 disclose a high molecular weight tetrafluoroethylene homopolymer having a specific breaking strength.

Patent Literature documents 6 to 8 disclose a polytetrafluoroethylene aqueous dispersion obtained by polymerization in the presence of a specific emulsifier.

Patent Literature documents 9 to 11 disclose a tetrafluoroethylene-based copolymer modified with a perfluoroalkyl ethylene (PFAE).

Patent Literature 12 discloses non-melt-fabricable polytetrafluoroethylene fine powder for molding a stretched article and obtained by polymerizing tetrafluoroethylene and perfluoro(methyl vinyl ether).

CITATION LIST

Patent Literature

Patent Literature 1: JP H11-501961 T
Patent Literature 2: WO 2007/011492
Patent Literature 3: JP H05-202217 A
Patent Literature 4: JP 2000-143727 A
Patent Literature 5: JP 2002-201217 A
Patent Literature 6: WO 2007/046345
Patent Literature 7: WO 2009/001894
Patent Literature 8: WO 2010/113950
Patent Literature 9: JP H11-240917 A
Patent Literature 10: WO 2003/033555
Patent Literature 11: WO 2007/005361
Patent Literature 12: WO 2005/061567

SUMMARY OF INVENTION

Technical Problem

Patent Literature documents 4 to 8 disclose a high molecular weight tetrafluoroethylene homopolymer having a specific breaking strength. However, stretched articles obtained by stretching such a homopolymer still have insufficient strength.

The PTFE fine powder modified with a perfluoroalkyl ethylene (PFAE), which is disclosed in Patent Literature documents 9 to 11, and the PTFE fine powder modified with perfluoro(methyl vinyl ether), which is disclosed in Patent Literature 12, disadvantageously provide poorly homogeneous molded products.

The present invention aims to provide a porous body having high strength, a small pore size, and excellent homogeneity.

Solution to Problem

The present invention relates to a porous body comprising polytetrafluoroethylene and having a microstructure that includes nodes and fibrils, the microstructure further including, in addition to the nodes and the fibrils, fused points where a fibril that links two nodes and another fibril that links another two nodes are fused with each other.

The microstructure preferably has five or more fused points within an area of 5 μm×5 μm observed in an electron microscopic image taken using a scanning electron microscope at a magnification of 10000×.

The polytetrafluoroethylene is preferably obtained by copolymerizing tetrafluoroethylene and a trace comonomer.

The trace comonomer preferably at least contains perfluoro(methyl vinyl ether).

The polytetrafluoroethylene preferably comprises 0.011 mol % or more of a polymer unit derived from perfluoro(methyl vinyl ether) in all the monomer units.

The porous body of the present invention is preferably a porous membrane.

The porous body of the present invention is preferably only obtained by biaxial stretching.

The present invention also relates to a filter material for filters comprising the above porous body.

The present invention also relates to a filter unit comprising the filter material for filters and a frame that holds the filter material for filters.

The present invention also relates to a polymer electrolyte membrane comprising the above porous body.

The porous body of the present invention is preferably a porous hollow fiber.

The porous body of the present invention is preferably a porous fiber.

Advantageous Effects of Invention

Since the porous body of the present invention has the aforementioned configuration, it has high strength, a small pore size, and excellent homogeneity.

DESCRIPTION OF EMBODIMENTS

The present invention will be described in detail below.

The porous body of the present invention is a porous body comprising polytetrafluoroethylene and having a microstructure that includes nodes and fibrils, and the microstructure further includes, in addition to the nodes and the fibrils, fused points where a fibril that links two nodes and another fibril that links another two nodes are fused with each other.

Figure 1:
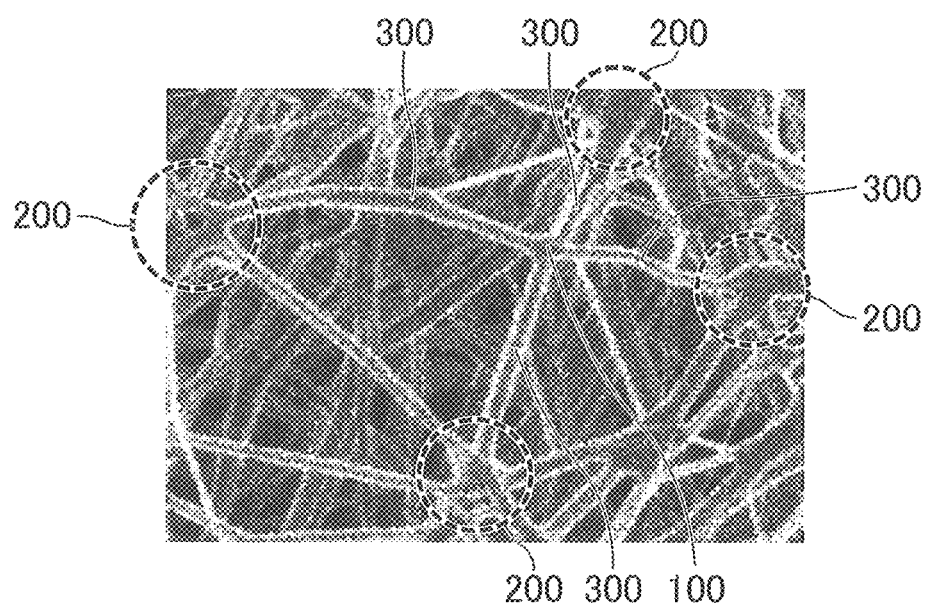
FIG. 1 is an image taken by observing the porous body of the present invention using a scanning electron microscope.
Figure 2:
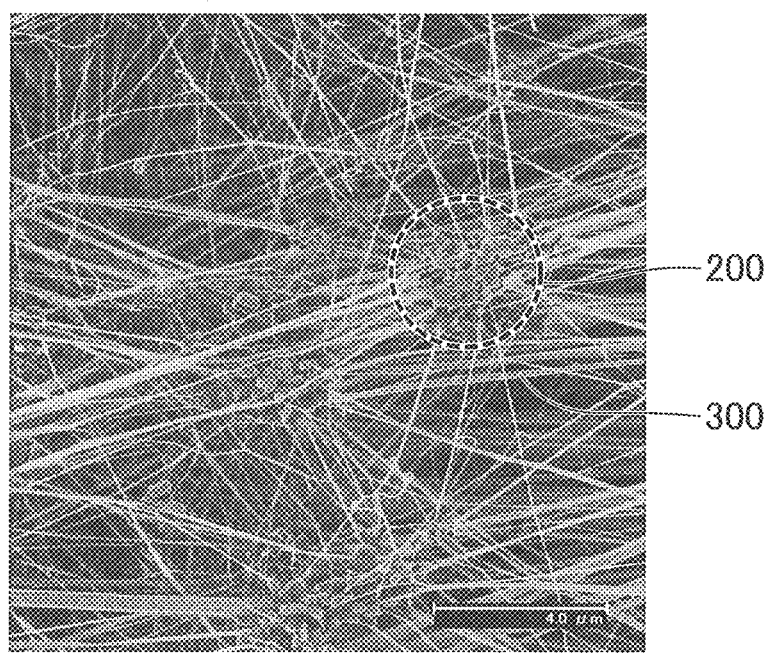
FIG. 2 is an image taken by observing a conventional porous body using a scanning electron microscope.

As shown in the scanning electron microscopic image of FIG. 2, a conventional porous body has a microstructure including nodes 200 and fibrils 300, but the fibrils only three-dimensionally cross each other. In contrast, as shown in the scanning electron microscopic image of FIG. 1, the porous body of the present invention has a characteristic microstructure including fused points 100 where fibrils are fused with each other.

The microstructure including the above fused points leads to a porous body having high strength, a small pore size, and excellent homogeneity.

The microstructure includes a microstructure comprising nodes (knots) and fibrils.

A porous body obtained by stretching polytetrafluoroethylene usually comprises fine small fibers (called fibrils) and granular knots (called nodes) that link the fibrils, and has a continuous porous structure in which very minute pores exist between fibrils and nodes in a continuously alternate manner.

The nodes are usually granular portions or island-like portions (portions where primary particles aggregate) formed of folded crystals of polytetrafluoroethylene. The fibrils are formed of polytetrafluoroethylene fibrously extended from the nodes and link the nodes in a slatted-blind-like or cobweb-like shape.

The nodes are usually unstretched portions during the stretching and exist at ends of the fibrils. The sizes of the masses to which fibrils link are thicker than the diameters of the fibrils.

The nodes are also usually primary particles or aggregates of primary particles, and the fibrils radially extend from the nodes.

When a fibril is branched and a branched portion has the same diameter as the original fibril, the branched portion is not treated as a node herein.

The microstructure includes fused points in addition to the nodes and the fibrils. Since the porous body of the present invention has a microstructure including fused points, it has high strength and excellent homogeneity.

At each of the fused points, a fibril that links two nodes and another fibril that links another two nodes are fused with each other.

Each fused point is formed by fusion of at least two three-dimensionally crossing fibrils at the crossing point. The fused point is formed by fusion of two fibrils, and the two fibrils forming the fused point each link two nodes. A set of nodes linked by one fibril is different from a set of nodes linked by the other fibril. Two or more fused points may be formed by fusion of one fibril with other two fibrils. The fused points are formed by fusion of fibrils during the stretching.

The fused points are formed by fusion of at least two three-dimensionally crossing fibrils at the crossing point in a single porous body.

The fibrils forming the fused points are generated by stretching unsintered PTFE articles or a paste extrudate. The diameter of the fibrils can be adjusted in accordance with, for example, stretching conditions. The fibrils each usually have a diameter of at most about 5 µm in uniaxially stretched articles, and at most about 1 µm in biaxially stretched articles. The diameter of each fibril is preferably 0.7 µm or smaller, more preferably 0.5 µm or smaller.

Since the fused point is formed on one fibril that links one set of nodes, no change in the fibril diameter or in the fibril direction is observed in the vicinity of the fused point. Such structural characteristics are different from those of the structure of a node that has fibrils extending in many directions. Multiple fibrils extend from a node in many directions, and thus the fibrils have various diameters when the fibrils around the node are observed. Even if two fibrils having the same diameter are fortuitously observed, these fibrils hardly lie along the same line.

In other words, the fused points are easily distinguished from the nodes in that one fibril with a diameter difference of 10% or lower and a deviation from the straight line of within ±10 degrees can be observed across the fused point.

In order to provide a porous body having higher strength, a smaller pore size, and better homogeneity, the microstructure preferably include one or more fused points within an area of 5 μm×5 μm observed in an electron microscopic image taken using a scanning electron microscope at a magnification of 10000×. The number of the fused points is more preferably 5 or more, still more preferably 10 or more.

The porous body of the present invention comprises polytetrafluoroethylene (PTFE). The PTFE usually has stretchability, fibrillatability, non-melt-processability.

The non-melt-processability means a feature that makes it impossible to determine the melt flow rate at a temperature higher than the crystallization melting point, in other words, a feature of the polymer that does not easily flow even within a melting temperature zone, in conformity with ASTM D-1238 and D-2116.

The PTFE is preferably PTFE obtained by copolymerizing tetrafluoroethylene (TFE) and a trace comonomer.

The trace comonomer may be any monomer copolymerizable with TFE. Examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; and (perfluoroalkyl) ethylenes and ethylene. One trace comonomer may be used, or multiple trace comonomers may be used.

The perfluorovinyl ethers are not particularly limited, and examples thereof include unsaturated perfluoro compounds represented by the following formula (A):

$$CF_2=CF-ORf \quad\quad (A)$$

wherein Rf represents a perfluoroorganic group. The "perfluoroorganic group" herein means an organic group in which all the hydrogen atoms bonded to carbon atoms are replaced by fluorine atoms. The perfluoroorganic group may contain ether oxygen.

Examples of the perfluorovinyl ethers include perfluoro (alkyl vinyl ethers) (PAVE) represented by the formula (A) wherein Rf is a C1-C10 perfluoroalkyl group. The carbon number of the perfluoroalkyl group is preferably 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group.

Examples of the perfluorovinyl ether further include those represented by the formula (A) wherein Rf is a C4-C9 perfluoro(alkoxyalkyl) group, Rf is a group represented by the following formula:

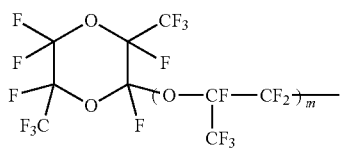

(wherein m is 0 or an integer of 1 to 4), or Rf is represented by the following formula:

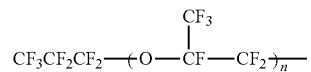

(wherein n is an integer of 1 to 4).

The (perfluoroalkyl)ethylenes (PFAE) are not particularly limited, and examples thereof include (perfluorobutyl)ethylene (PFBE) and (perfluorohexyl)ethylene.

In order to provide a porous body having high strength, a small pore size, and excellent homogeneity, the trace comonomer is preferably at least one selected from the group consisting of hexafluoropropylene, chlorotrifluoroethylene, vinylidene fluoride, fluoro(alkyl vinyl ethers), (perfluoroalkyl)ethylenes, and ethylene, more preferably at least one selected from the group consisting of perfluoro(methyl vinyl ether), perfluoro(propyl vinyl ether), (perfluorobutyl) ethylene, (perfluorohexyl)ethylene, and (perfluorooctyl)ethylene, still more preferably perfluoro(methyl vinyl ether).

The trace comonomer preferably at least includes perfluoro(methyl vinyl ether) (PMVE), more preferably consists only of PMVE.

In order to provide a porous body having higher strength, a smaller pore size, and better homogeneity, the PTFE preferably includes 0.011 mol % or more of a polymer unit derived from PMVE in all the monomer units. The amount of the polymer unit derived from PMVE is more preferably 0.015 mol % or more, still more preferably 0.025 mol % or more.

For good homogeneity of the porous body, the amount of the polymer unit derived from PMVE is preferably 0.250 mol % or less, more preferably 0.150 mol % or less, still more preferably 0.100 mol % or less. The amount thereof is most preferably 0.050 mol % or less.

The PTFE may be a polymer obtained by polymerizing TFE, PMVE, and a trace comonomer other than PMVE.

Examples of the trace comonomer other than PMVE include fluoroolefins such as hexafluoropropylene (HFP) and chlorotrifluoroethylene (CTFE); fluoro(alkyl vinyl ethers) having a C1-C5, particularly C1-C3, alkyl group; fluorinated cyclic monomers such as fluorodioxole; perfluoroalkyl ethylenes; and ω-hydroperfluoroolefins.

A polymer derived from the trace comonomer other than PMVE is used in an amount of preferably 0.0001 to 0.300 mol %, more preferably 0.010 to 0.100 mol %.

The PTFE is preferably PTFE that has never been heated at a temperature not lower than the primary melting point.

The PTFE may be unsintered PTFE or may be semi-sintered PTFE. For simple processing or easy control of the thickness and the pore size, unsintered PTFE is preferred. For high strength or a small pore size of a biaxially stretched membranes, semi-sintered PTFE is preferred.

The unsintered PTFE may be PTFE immediately after being polymerized, for example.

The unsintered PTFE is PTFE that has never been heated up to a temperature not lower than the secondary melting point. The semi-sintered PTFE is PTFE that has never been heated at a temperature not lower than the primary melting point but has been heated at a temperature not higher than the primary melting point but not lower than the secondary melting point.

The primary melting point means a maximum peak temperature of an endothermic curve on the crystal melting curve obtained by differential scanning calorimetry on unsintered PTFE.

The secondary melting point means a maximum peak temperature of an endothermic curve on the crystal melting curve obtained by differential scanning calorimetry on PTFE heated up to a temperature (e.g., 360° C.) not lower than the primary melting point.

The endothermic curve herein is obtained by increasing the temperature at a temperature-increasing rate of 10° C./min using a differential scanning calorimeter.

In order to provide a porous body having higher strength, a smaller pore size, and better homogeneity, the PTFE preferably has an average primary particle size of 150 nm or greater. The average primary particle size is more preferably 180 nm or greater, still more preferably 210 nm or greater, particularly preferably 220 nm or greater.

The greater the average primary particle size of PTFE is, the more suppressed an increase in the paste extrusion pressure during paste extrusion molding of PTFE powder is and the better the processability is. The upper limit may be any value, and may be 500 nm. For good productivity in the polymerization step, the average primary particle size is preferably 350 nm.

The average primary particle size can be determined as follows. Using an aqueous dispersion of PTFE obtained by polymerization, a calibration curve is drawn between the transmittance of 550-nm incident light to the unit length of the aqueous dispersion with a polymer concentration of 0.22 mass % and the average primary particle size determined by measuring the Feret diameters in a transmission electron microscopic image; the transmittance of the target aqueous dispersion is measured; and then the average particle size is determined on the basis of the calibration curve.

The PTFE may have a core-shell structure. The core-shell structured polytetrafluoroethylene may be, for example, a modified polytetrafluoroethylene whose particles each include a core of a high molecular weight polytetrafluoroethylene and a shell of a lower molecular weight polytetrafluoroethylene or of a modified polytetrafluoroethylene.

Such a modified polytetrafluoroethylene may be polytetrafluoroethylene described in JP 2005-527652 T, for example.

In order to provide a porous body having higher strength, a smaller pore size, and better homogeneity, the PTFE preferably has a standard specific gravity (SSG) of 2.160 or lower. Polytetrafluoroethylene having a SSG of 2.160 or lower is suitable for stretching because an extrudate thereof shows a stretching magnification of three times or more. For better stretchability, the SSG is more preferably 2.155 or lower, still more preferably 2.150 or lower, particularly preferably 2.145 or lower.

For suppression of an increase in the paste extrusion pressure and excellent processability during paste extrusion molding, the standard specific gravity is preferably 2.130 or higher.

The SSG is a SSG defined in ASTM D4895-89 as a standard for the molecular weight of polytetrafluoroethylene without melt-molding processability.

In order to provide a porous body having higher strength, a smaller pore size, and better homogeneity, the PTFE preferably shows an extrusion pressure of 22.0 MPa or lower, more preferably 20.0 MPa or lower, still more preferably 19.0 MPa or lower, particularly preferably 18.0 MPa or lower.

If the extrusion pressure is too high, the resulting extrudate tends to be hard and less likely to be compressed during a rolling step to be mentioned later, so that the homogeneity of the porous body tends to be poor. PTFE having a low extrusion pressure tends to cause a porous body to have low strength. Still, even with an extrusion pressure within the above range, the porous body of the present invention can surprisingly have excellent strength.

The lower limit of the extrusion pressure may be any value, and may be 12.0 MPa, for example.

The extrusion pressure is a value determined by the following method in conformity with JP 2002-201217 A.

First, 100 g of PTFE fine powder is blended with a lubricant (trade name: IP1620 (registered trademark), Idemitsu Petrochemical Co., Ltd.) in an amount of 18.0 mass % based on the sum of the amounts of the PTFE fine powder and the lubricant, and the components are mixed in a glass bottle for three minutes at room temperature. Next, the glass bottle is left to stand for at least one hour at room temperature (25° C.) before extrusion, and thereby a lubricated resin is obtained. The lubricated resin is paste-extruded through an orifice (diameter: 2.5 mm, land length: 5 mm, introduction angle: 30°) at room temperature and a reduction ratio of 100:1, and thereby uniform beading (extrudate) is obtained. The extrusion rate, i.e., ram speed, is 20 in/min (51 cm/min). The extrusion pressure is a value determined by measuring a load when the extrusion load reaches equilibrium during the paste extrusion, and then dividing the measured load by the cross-sectional area of a cylinder used in the paste extrusion.

In order to provide a porous body having higher strength, a smaller pore size, and better homogeneity, the PTFE preferably has a breaking strength of 20 N or higher. The breaking strength is more preferably 28 N or higher, still more preferably 32 N or higher, particularly preferably 36 N or higher.

In the case of stretching at a high stretch ratio, the breaking strength is preferably within the above range.

The upper limit of the breaking strength may be any value, and may be 70 N, for example.

The breaking strength is a value determined by the following method in conformity with JP 2002-201217 A.

First, the beading obtained by the paste extrusion in the extrusion pressure measurement is heated at 230° C. for 30 minutes so that the lubricant is removed from the beading. Next, the beading (extrudate) is cut into an appropriate length and the resulting sample is held at its ends by clamps with a gap between the clamps of any of 5.1 cm. The sample is then heated up to 300° C. in an air-circulation furnace, and the clamps are moved apart from each other at a stretching rate of 100%/sec until the distance between the clamps corresponds to a total stretch of 2400%. Thereby, stretched beading (a product obtained by stretching the beading) is prepared.

This stretching method is essentially in accordance with the method disclosed in U.S. Pat. No. 4,576,869 B except for the extrusion rate (not 84 cm/min but 51 cm/min). The term "stretch" herein means an increase in the length by stretching, and is usually represented in relation to the original length.

The breaking strength is determined as a minimum tensile load at break among three samples (two samples which are taken from the respective ends of the stretched beading (if there is neck-down within the area that overlaps the clamp, it is removed) and one from the center of the stretched beading) obtained from the stretched beading.

The minimum tensile load at break is the minimum value among the tensile strengths at break of the three samples each measured by a tensile test in which a sample is held by movable jaws with a gauge length (distance between chucks) of 5.0 cm, the movable jaws are moved at a speed of 300 mm/min, and the sample is stretched at 25° C. and at a speed of 300 mm/min using a tensile tester.

In order to provide a porous body having higher strength, a smaller pore size, and better homogeneity, the PTFE particularly preferably has an extrusion pressure of 20.0 MPa or lower and a breaking strength of 28 N or higher, most preferably an extrusion pressure of 19.0 MPa or lower and a breaking strength of 30 N or higher.

The porous body of the present invention can be formed from PTFE fine powder comprising the aforementioned PTFE.

The PTFE fine powder usually has an average particle size of 100 to 1000 μm. In order to provide a porous body having better homogeneity, the average particle size is preferably 300 to 800 μm, more preferably 400 to 700 μm.

The average particle size of the PTFE fine powder is a value determined in conformity with JIS K6891.

The PTFE fine powder usually has an apparent density of 0.35 to 0.60 g/ml. In order to provide a porous body having better homogeneity, the apparent density is preferably 0.40 to 0.55 g/ml.

The apparent density is a value determined in conformity with JIS K6892.

The PTFE can be produced by a production method including a step of putting a surfactant, an aqueous medium, TFE, and a trace comonomer into a polymerization vessel, and a step of putting a polymerization initiator into the polymerization vessel and then starting emulsion copolymerization of the TFE and the trace comonomer.

The trace comonomer may be supplied at once before the start of the polymerization, or may be supplied continually or intermittently.

The production method may include a step of coagulating the PTFE in a PTFE aqueous dispersion obtained by the emulsion copolymerization. Coagulation of the PTFE provides PTFE fine powder.

The production method usually includes a step of collecting the coagulated PTFE and a step of drying the collected PTFE.

The emulsion copolymerization is described below with reference to a more specific example. For example, an aqueous medium and a surfactant are charged into a pressure-resistant reaction container equipped with a stirrer and the oxygen in the container is removed. Then, TFE and a trace comonomer are charged into the container and the system is set to a predetermined temperature. Next, a polymerization initiator is added so as to start the emulsion copolymerization. The pressure decreases as the reaction proceeds. In order to maintain the initial pressure, the TFE and, if necessary, the trace comonomer are additionally supplied in a continual or intermittent manner. Supply of the TFE and the trace comonomer is stopped when the amounts thereof reach predetermined amounts. Then, the TFE inside the reaction container is purged and the temperature is returned to room temperature. Thereby, the reaction was completed.

In order to provide a porous body having higher strength, a smaller pore size, and better homogeneity, the surfactant is more preferably a fluorosurfactant having a Log POW value of 3.4 or lower.

It is feared that compounds having a high Log POW value cause environmental loads. In consideration of this fear, a compound having a Log POW value of 3.4 or smaller is preferred. In conventional production of a fluoropolymer by emulsion polymerization, ammonium perfluorooctanoate (PFOA) is mainly used as a surfactant. However, PFOA has a Log POW value of 3.5, and thus it is preferably replaced by a fluorosurfactant having a Log POW value of 3.4 or lower.

In contrast, fluorosurfactants having a Log POW value of 3.4 or lower disadvantageously have a poor emulsifying ability. In order to provide PTFE having high breaking strength, the stability of the aqueous dispersion during the polymerization is believed to be important. Actually, use of a fluorosurfactant having a poor emulsifying ability results in insufficient breaking strength.

Thus, WO 2009/001894 discloses a method in which a large amount of a fluorosurfactant having a low Log POW value is used so as to improve the stability of an aqueous dispersion. However, even PTFE obtained by this method has insufficient breaking strength.

Use of PTFE obtained by emulsion copolymerizing tetrafluoroethylene and perfluoromethyl vinyl ether (PMVE) in the presence of a fluorosurfactant having a Log POW value of 3.4 or lower enables production of a porous body having the aforementioned microstructure and having high strength, a small pore size, and excellent homogeneity.

In other words, the PTFE is preferably one obtained by emulsion copolymerizing tetrafluoroethylene and at least perfluoromethyl vinyl ether in the presence of a fluorosurfactant having a Log POW value of 3.4 or lower.

The surfactant may be a fluorosurfactant having a Log POW value of 2.5 or higher, or may be a fluorosurfactant having a Log POW value of 3.0 or higher.

The Log POW value is a partition coefficient between 1-octanol and water, and is represented by Log P, wherein P represents the ratio of (fluorosurfactant concentration in octanol)/(fluorosurfactant concentration in water) when an octanol/water (1:1) liquid mixture containing a fluorosurfactant is phase-separated.

The octanol-water partition coefficient represented by Log POW is calculated as follows. HPLC is performed on standard substances (heptanoic acid, octanoic acid, nonanoic acid, and decanoic acid) each having a known octanol-water partition coefficient using TOSOH ODS-120T column (φ4.6 mm×250 mm) as a column and acetonitrile/0.6 mass % HClO$_4$ aqueous solution=1/1 (vol/vol %) as an eluent at a flow rate of 1.0 ml/min, a sample amount of 300 μL, and a column temperature of 40° C., with detection light UV 210 nm. A calibration curve between the respective elution times and the known octanol-water partition coefficients is drawn, and the Log POW value is calculated from the elution time of the sample liquid in HPLC based on the calibration curve.

The fluorosurfactant having a Log POW value of 3.4 or lower is preferably a fluoroanionic surfactant. Examples thereof include those disclosed in US 2007/0015864 A, US 2007/0015865 A, US 2007/0015866 A, US 2007/0276103 A, US 2007/0117914 A, US 2007/142541 A, US 2008/0015319 A, U.S. Pat. Nos. 3,250,808 B, 3,271,341 B, JP 2003-119204 A, WO 2005/042593, WO 2008/060461, WO 2007/046377, WO 2007/119526, WO 2007/046482, and WO 2007/046345.

The fluorosurfactant having a Log POW value of 3.4 or lower is preferably at least one fluorosurfactant selected from the group consisting of those represented by the following formula:

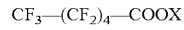

(wherein X represents a hydrogen atom, NH$_4$, or an alkali metal), those represented by the following formula:

(wherein X represents a hydrogen atom, $NH_4$, or an alkali metal atom), those represented by the following formula:

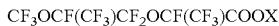
$CF_3OCF(CF_3)CF_2OCF(CF_3)COOX$ (wherein X represents a hydrogen atom, $NH_4$, or an alkali metal atom), and those represented by the following formula:

$CF_3CF_2OCF_2CF_2OCF_2COOX$ (wherein X represents a hydrogen atom, $NH_4$, or an alkali metal atom).

The fluorosurfactant having a Log POW value of 3.4 or lower may also be any of those represented by the following formula:

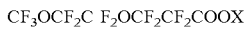
$CF_3OCF_2CF_2OCF_2CF_2COOX$ (wherein X represents a hydrogen atom, $NH_4$, or an alkali metal atom) and those represented by the following formula:

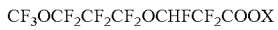
$CF_3OCF_2CF_2CF_2OCHFCF_2COOX$ (wherein X represents a hydrogen atom, $NH_4$, or an alkali metal atom).

If the fluorosurfactant is a salt, a counter ion constituting the salt may be an alkali metal ion or $NH^{4+}$, for example, and examples of the alkali metal ion include $Na^+$ and $K^+$.

Examples of the fluorosurfactant having a Log POW value of 3.4 or lower include $CF_3OCF(CF_3)CF_2OCF(CF_3)COOH$, $CF_3OCF(CF_3)CF_2OCF(CF_3)COONH_4$, $CF_3CF_2OCF_2CF_2OCF_2COOH$, $CF_3CF_2OCF_2CF_2OCF_2COONH_4$, $CF_3OCF_2CF_2CF_2OCHFCF_2COOH$, $CF_3OCF_2CF_2CF_2OCHFCF_2COONH_4$, $CF_3—(CF_2)4$-COOH, $CF_3—(CF_2)_4—COONH_4$, $CF_3CF_2CF_2OCF(CF_3)COONH_4$, and $CF_3CF_2CF_2OCF(CF_3)COOH$.

The total amount of the surfactant added is preferably 0.0001 to 10 mass % based on the amount of the aqueous medium. The lower limit thereof is more preferably 0.1 mass %, whereas the upper limit thereof is more preferably 2 mass %, still more preferably 1 mass %.

If the total amount of the surfactant is too small, the emulsified particles may have poor stability and the yield may be insufficient, so that the system may be unstable; for example, a large amount of coagulated matter is generated or a large amount of matter is attached to the reaction container during and after the reaction. If the total amount of the surfactant is too large, the effect of improving the stability does not compensate for the amount. On the contrary, the system may be unstable; for example, the polymerization rate may decrease or the reaction may stop.

The surfactant may be added to the container at once before the start of the polymerization reaction, or may be continually or intermittently added thereto after the start of the polymerization reaction.

The amount of the surfactant is appropriately determined in accordance with, for example, the stability of the emulsified particles and the primary particle size of the target PTFE.

The polymerization initiator used in the emulsion copolymerization can be any of those conventionally used in polymerization of TFE.

The polymerization initiator in the emulsion copolymerization may be a radical polymerization initiator or a redox polymerization initiator, for example.

In order to provide PTFE having a low SSG, the amount of the polymerization initiator is preferably as small as possible. Still, too small an amount of the polymerization initiator tends to cause too low a polymerization rate, whereas too large an amount thereof tends to cause generation of high SSG PTFE.

Examples of the radical polymerization initiator include water-soluble peroxides. The radical polymerization initiator is preferably any of persulfates, such as ammonium persulfate and potassium persulfate, and water-soluble organic peroxides, such as disuccinic acid peroxide, more preferably ammonium persulfate or disuccinic acid peroxide. One of these initiators may be used, or two or more of these may be used in combination.

The amount of the radical polymerization initiator can be appropriately selected in accordance with the polymerization temperature and the target SSG. It is preferably an amount corresponding to 1 to 100 ppm, more preferably an amount corresponding to 1 to 20 ppm, still more preferably an amount corresponding to 1 to 6 ppm, of the mass of an aqueous medium usually used.

If the polymerization initiator is a radical polymerization initiator, the radical concentration in the system may be adjusted by adding a decomposer for peroxides such as ammonium sulfite during the polymerization.

If the polymerization initiator is a radical polymerization initiator, PTFE having a low SSG can be easily obtained by adding a radical scavenger during the polymerization.

Examples of the radical scavenger include unsubstituted phenols, polyphenols, aromatic hydroxy compounds, aromatic amines, and quinone compounds. Hydroquinone is particularly preferred.

In order to provide PTFE having a low SSG, the radical scavenger is preferably added before 50 mass % of the whole TFE to be consumed in the polymerization reaction is polymerized. The radical scavenger is more preferably added before 40 mass %, still more preferably 30 mass %, of the whole TFE is consumed.

The amount of the radical scavenger is preferably an amount corresponding to 0.1 to 20 ppm, more preferably an amount corresponding to 3 to 10 ppm, of the mass of an aqueous medium used.

Examples of the redox polymerization initiator include combination of any oxidizing agent, such as permanganates (e.g., potassium permanganate), persulfates, bromates, chlorides, and hydrogen peroxide, and any reducing agent, such as sulfites, bisulfites, organic acids (e.g., oxalic acid or succinic acid), thiosulfates, ferrous chloride, and diimines. The oxidizing agents and the reducing agents each may be used alone or in combination of two or more.

Particularly preferred is a combination of potassium permanganate and oxalic acid.

The amount of the redox polymerization initiator can be appropriately selected in accordance with the type of a redox polymerization initiator used, the polymerization temperature, and the target SSG. The amount thereof is preferably an amount corresponding to 1 to 100 ppm of the mass of an aqueous medium used.

In order to initiate the polymerization reaction by the redox polymerization initiator, the oxidizing agent and the reducing agent may be simultaneously added, or either of the oxidizing agent or the reducing agent may be added to the container in advance, and then the remaining agent is added thereto.

In the case of initiating the polymerization with the redox polymerization initiator by adding either of the oxidizing agent or the reducing agent to the container in advance, and then adding the remaining agent, the remaining agent is preferably added continually or intermittently.

In order to provide low SSG PTFE with the redox polymerization initiator by adding the remaining agent continually or intermittently, the adding rate is preferably gradually reduced, more preferably the addition is stopped during the polymerization. The timing of stopping the addition is preferably before 80 mass % of the whole TFE to be consumed in the polymerization reaction is polymerized. The timing is more preferably before 65 mass % of the whole TFE is polymerized, still more preferably before 50 mass % of the whole TFE is polymerized, particularly preferably before 30 mass % of the whole TFE is polymerized.

In order to adjust the pH in the aqueous medium within a range that does not deteriorate the redox reactivity in the case of using a redox polymerization initiator, a pH buffer is preferably used. Examples of the pH buffer include inorganic salts such as disodium hydrogen phosphate, sodium dihydrogen phosphate, and sodium carbonate, and disodium hydrogen phosphate dihydrate and disodium hydrogen phosphate dodecahydrate are preferred.

In the case of using a redox polymerization initiator, the redox-reactive metal ion can be a metal having multiple ionic valences. Specific examples thereof include, preferably, transition metals such as iron, copper, manganese, and chromium, and iron is particularly preferred.

The aqueous medium means a medium which gives a place of the polymerization and is a liquid that contains water. The aqueous medium may be water alone or any of those containing water. It may be one containing water and one or both of any fluorine-free organic solvent, such as alcohols, ethers, and ketones, and any fluorine-containing organic solvent having a boiling point of 40° C. or lower.

The polymerization can be performed under a pressure of 0.05 to 5.0 MPa. The pressure is preferably within the range of 0.5 to 3.0 MPa.

The polymerization can be performed at a temperature of 10° C. to 100° C. The temperature is preferably within the range of 50° C. to 90° C.

In the polymerization, any known additive such as stabilizers and chain-transfer agents may be added in accordance with the purposes.

Examples of the stabilizers include saturated hydrocarbons that are substantially inactive to the reaction, are in the form of liquid under the reaction conditions, and have 12 or more carbon atoms. In particular, paraffin wax is preferred. The paraffin wax may be in any form, i.e., liquid, semisolid, or solid, at room temperature. It is preferably a saturated hydrocarbon having 12 or more carbon atoms. In general, the paraffin wax preferably has a melting point of 40° C. to 65° C., more preferably 50° C. to 65° C.

Examples of a dispersion stabilizer other than the saturated hydrocarbons include fluorine-type oils, fluorine-type solvents, and silicone oils. Each of these may be used alone or two or more of these may be used in combination. The stabilizer can be used in an amount of 1 to 10 parts by mass for 100 parts by mass of the aqueous medium.

The chain-transfer agents may be any of known agents, and examples thereof include saturated hydrocarbons such as methane, ethane, propane, and butane, halogenated hydrocarbons such as chloromethane, dichloromethane, and difluoroethane, alcohols such as methanol and ethanol, and hydrogen. The amount of the chain-transfer agent is usually 1 to 1000 ppm, preferably 1 to 500 ppm, for the whole amount of the TFE supplied.

In order to adjust the pH in the aqueous medium within a range that does not deteriorate the redox reactivity in the case of using a redox polymerization initiator, a pH buffer is preferably used. Examples of the pH buffer include inorganic salts such as disodium hydrogen phosphate, sodium dihydrogen phosphate, and sodium carbonate, and disodium hydrogen phosphate dihydrate and disodium hydrogen phosphate dodecahydrate are preferred.

In the case of using a redox polymerization initiator, the redox-reactive metal ion can be a metal having multiple ionic valences. Specific examples thereof include, preferably, transition metals such as iron, copper, manganese, and chromium, and iron is particularly preferred.

In order to reduce the amount of coagulum generated during the polymerization, the polymerization may be performed in the presence of 5 to 500 ppm of a dicarboxylic acid based on the amount of the aqueous medium. In such a case, the polymerization is preferably performed in the presence of 10 to 200 ppm of the dicarboxylic acid. If the amount of the dicarboxylic acid is too small relative to the aqueous medium, insufficient effects may be achieved. If the amount thereof is too large, a chain transfer reaction may occur so that the resulting polymer may have a low molecular weight. The amount of the dicarboxylic acid is preferably 150 ppm or less. The dicarboxylic acid may be added before the start of the polymerization reaction, or may be added during the polymerization.

The dicarboxylic acid is preferably any of those represented by the formula: HOOCRCOOH (wherein R represents a C1-C5 alkylene group), more preferably succinic acid, malonic acid, glutaric acid, adipic acid, or pimelic acid, still more preferably succinic acid.

When the polymerization of PTFE is completed, an aqueous dispersion having a solid concentration of 10 to 50 mass % can be obtained. The aqueous dispersion contains the fluorosurfactant and polytetrafluoroethylene. The polytetrafluoroethylene has an average primary particle size of 150 to 500 nm.

The production method preferably includes a step of coagulating the PTFE in the resulting PTFE aqueous dispersion, a step of collecting the coagulated PTFE, and a step of drying the collected PTFE.

Coagulation of the polytetrafluoroethylene contained in the aqueous dispersion leads to PTFE fine powder.

The polytetrafluoroethylene aqueous dispersion can be formed into and collected as fine powder after coagulation, washing, and drying, and then the fine powder can be used in production of porous bodies. In the case of coagulating the polytetrafluoroethylene in the aqueous dispersion, the aqueous dispersion obtained by polymerization of polymer latex, for example, is usually diluted with water to a polymer concentration of 10 to 20 mass %. The temperature of the diluted product is adjusted to 5° C. to 50° C., and the pH thereof may be adjusted to neutral or alkali, if necessary, and then the neutralized or alkalified product is stirred in a container equipped with a stirrer more vigorously than during the reaction. The coagulating temperature can be appropriately selected in accordance with the shape and size of a stirrer used, the polymer concentration, and the target average particle size of fine powder. The coagulation may be performed under stirring while adding, as a coagulating agent, any of water-soluble organic compounds such as methanol and acetone, inorganic salts such as potassium nitrate and ammonium carbonate, and inorganic acids such as hydrochloric acid, sulfuric acid, and nitric acid. The coagulation may be continually performed using, for example, an inline mixer.

The drying of wet powder obtained by coagulating the PTFE is usually performed with the wet powder being maintained in a state of not so much flowing, preferably in a state of being left to stand, by means of vacuum, high frequency, hot air, or the like. In general, friction between particles, especially at high temperature, adversely affects the polytetrafluoroethylene fine powder. This is because the particles of such polytetrafluoroethylene are characteristically easily fibrillated even by a low shearing force, losing the originally stable particle structure. The drying can be performed at a drying temperature of 10° C. to 250° C., preferably 120° C. to 230° C.

The porous body of the present invention preferably has a product of vertical and lateral matrix tensile strengths of $2.20 \times 10^4$ MPa$^2$ or higher. The product is more preferably $3.00 \times 10^4$ MPa$^2$ or higher, still more preferably $5.00 \times 10^4$ MPa$^2$ or higher.

The vertical and lateral matrix tensile strengths are values determined by the following methods.

(Vertical Matrix Tensile Strength)

Five samples are cut out of the porous body. Each sample has a dimension of 15.0 cm in the machine direction (longitudinal direction, i.e., paste extruding direction) and 2.0 cm in the transverse direction (width direction, i.e., direction perpendicular to the paste extruding direction). For the five samples, the tensile strength in the machine direction is measured and the maximum loads of the respective five samples are determined.

Then, the largest one and the smallest one of the maximum loads of the five samples are excluded and an average value of the remaining three values is calculated. This average value is defined as the vertical average maximum load.

The vertical matrix tensile strength is determined by the following formula using the vertical average maximum load, the sample width (2.0 cm), the thickness (unit: cm), and the porosity.

$$\text{Vertical matrix tensile strength} = \{(\text{vertical average maximum load})/(2.0 \times \text{thickness})\}/(1-\text{porosity}).$$

(Lateral Matrix Tensile Strength)

Five samples are cut out of the porous body. Each sample has a dimension of 2.0 cm in the machine direction (longitudinal direction, i.e., paste extruding direction) and 15.0 cm in the transverse direction (width direction, i.e., direction perpendicular to the paste extruding direction). For the five samples, the tensile strength in the transverse direction is measured and the maximum loads of the respective five samples are determined.

Next, the lateral average maximum load is calculated in the same manner as in the case of the machine direction, and the lateral matrix tensile strength is determined using the following formula.

$$\text{Lateral matrix tensile strength} = \{(\text{lateral average maximum load})/(2.0 \times \text{thickness})\}/(1-\text{porosity}).$$

In the tensile strength measurements, a tensile tester equipped with a 50 N load cell is used at a chuck length of 5.0 cm and a cross-head speed of 300 mm/min.

The porosity is a value determined by the following formula.

$$\text{Porosity} = 1 - ((\text{film density})/(\text{PTFE true density}))$$

The PTFE true density is 2.2 g/cm$^3$.

The thickness and the film density are determined by the methods to be mentioned later.

The porous body of the present invention preferably allows a large amount of gas or liquid to permeate or flow therethrough, and thus the film density thereof is preferably 1.40 g/cm$^3$ or lower. The film density is more preferably 1.00 g/cm$^3$ or lower, still more preferably 0.80 g/cm$^3$ or lower.

The film density is a value determined by the following method.

A rectangular sample with a size of 4.0 cm×12.0 cm is cut out of the porous body, and the mass of the sample is measured using a precision scale, and the density of the sample is calculated by the following formula based on the measured mass and the thickness.

$$\rho = M/(4.0 \times 12.0 \times t)$$

wherein
  $\rho$=film density (g/cm$^3$)
  M=mass (g)
  t=thickness (cm).

The measurement and the calculation are performed at three points, and the average value thereof is defined as the film density.

The porous body of the present invention preferably has an average pore size of 0.05 to 2.0 µm, more preferably within the range of 0.2 to 1.5 µm.

The porous body having an average pore size within the above range can be suitably used in applications such as microfiltration membranes for liquid (including liquid chemical).

For the use as an air filter, the average pore size is preferably 0.4 to 2.0 µm in order to maintain a low pressure loss.

The average pore size is a mean flow pore size (MFP) measured in conformity with ASTM F316-86.

The average pore size of the porous body of the present invention is also preferably 2.00 µm or smaller, more preferably 1.00 µm or smaller. If high membrane strength is required, the average pore size is preferably small. Thus, the average pore size is still more preferably 0.60 µm or smaller, particularly preferably 0.40 µm or smaller.

The average pore size is preferably 0.05 µm or larger, more preferably 0.10 µm or larger, still more preferably 0.20 µm or larger.

The porous body of the present invention is preferably a porous membrane. If the porous body of the present invention is a porous membrane, the thickness thereof is preferably 0.5 µm or higher. The thickness is more preferably 1 µm or higher, still more preferably 3 µm or higher. If the thickness is too small, the mechanical strength may be poor. The upper limit of the thickness may be any value, and it may be 100 µm, for example.

For the use as an air filter, the upper limit of the thickness is preferably 100 µm in order to suppress an increase in the pressure loss.

The thickness is determined as follows: five porous membranes are stacked and the total thickness is measured using a thickness meter, and the measured value is divided by 5. The quotient is defined as the thickness of one membrane.

The porous body of the present invention may further contain any known additive in addition to the PTFE. For example, the porous body preferably contains any of carbon materials, such as carbon nanotube and carbon black, pigments, photo-catalysts, active carbon, antibacterial substances, adsorbents, deodorants, and the like.

The above known additives can be used in amounts that do not deteriorate the effects of the present invention. For example, the porous body of the present invention preferably contains 40 mass % or less, more preferably 30 mass % or less, of the known additive(s) in total.

Conversely, the porous body of the present invention preferably contains 60 mass % or more, more preferably 70 mass % or more, of the PTFE.

The porous body of the present invention can be produced by, for example, a production method including: a paste extrusion step of paste extruding PTFE fine powder comprising the PTFE to provide a paste extrudate; a rolling step of rolling the paste extrudate to provide unsintered PTFE; a drying step of drying the unsintered PTFE to remove an extrusion aid; an optional semi-firing step of semi-firing the dried unsintered PTFE to provide semi-sintered PTFE; a uniaxial stretching step of stretching the resulting dried unsintered PTFE or semi-sintered PTFE in the machine direction (MD) to provide a uniaxially stretched article; and a biaxial stretching step of stretching the resulting uniaxially stretched article in the transverse direction (TD).

The above method easily fibrillates polytetrafluoroethylene, and thereby enables production of a biaxially stretched porous membrane comprising knots and fibers.

The machine direction (MD) is usually the same direction as the paste extruding direction in the paste extrusion step. The transverse direction (TD) is a direction perpendicular to the machine direction.

In general, a uniaxially stretched article is first obtained by stretching in the machine direction after the rolling step (or the optional step of providing a semi-sintered article), and then a biaxially stretched article is obtained by stretching in the transverse direction. Alternatively, a uniaxially stretched article may be first obtained by stretching in the transverse direction after the rolling step (or the optional step of providing a semi-sintered article), and then a biaxially stretched article may be obtained by stretching in the machine direction.

If the stretch ratio is limited due to, for example, the design of stretching equipment, stretching in the machine direction (the uniaxial stretching step) and stretching in the transverse direction (the biaxial stretching step) each may be performed multiple times (what is called multi-stage stretching).

Production of the porous body of the present invention requires no special equipment design, and can be achieved by very usual molding and stretching equipment.

The porous body of the present invention may be a uniaxially stretched porous body obtained by uniaxial stretching. Still, it is more preferably a biaxially stretched porous body obtained by biaxial stretching as mentioned above.

The production method preferably includes, before the paste extrusion step, a step of adding a liquid lubricant such as solvent naphtha or white oil to the PTFE fine powder and mixing the components to provide PTFE fine powder mixed with the liquid lubricant.

The amount of the liquid lubricant is preferably 17 to 34 parts by mass for 100 parts by mass of the PTFE fine powder, although it is in accordance with, for example, the paste extrusion conditions to be mentioned later.

The paste extrusion step is preferably such that a rod-like or sheet-like paste extrudate is obtained using an extruder equipped with a die having a specific diameter or a die capable of providing a sheet-like extrudate.

In the paste extrusion step, the extrusion pressure can be appropriately set in accordance with the extruder used and the extrusion rate, for example.

In order to provide a porous body having high strength, a small pore size, and excellent homogeneity, the extrusion temperature in the paste extrusion step is preferably 5° C. to 100° C. The extrusion temperature is more preferably 30° C. to 80° C.

The paste extrusion step is preferably such that the PTFE fine powder is pre-formed to provide a pre-formed article, and then this pre-formed article is extruded through an extruder to provide a rod-like or sheetlike paste extrudate.

The rolling temperature in the rolling step is preferably 5° C. to 100° C., more preferably 30° C. to 80° C.

The unsintered PTFE after the rolling usually has a thickness of 20 to 500 μm, preferably 50 to 400 μm.

The drying step may be performed at room temperature or may be performed under heating. If a liquid lubricant is used as mentioned above, the drying can remove the liquid lubricant. The drying temperature is preferably 70° C. to 280° C., more preferably 100° C. to 250° C., although it is in accordance with, for example, the type of a liquid lubricant.

The rolling can be performed using a mill roll or a belt press, for example.

The production method optionally includes a step of semi-sintering the unsintered PTFE to provide semi-sintered PTFE.

"Semi-sintering" means heating at a temperature not higher than the primary melting point and not lower than the secondary melting point of PTFE.

The primary melting point means a maximum peak temperature of an endothermic curve existing on the crystal melting curve obtained by differential scanning calorimetry on the unsintered PTFE.

The secondary melting point means a maximum peak temperature of an endothermic curve existing on the crystal melting curve obtained by differential scanning calorimetry on the PTFE heated up to a temperature (for example, 360° C.) not lower than the primary melting point.

The endothermic curve herein is obtained by increasing the temperature at a temperature-increasing rate of 10° C./min using a differential scanning calorimeter.

In order to provide a porous body having high strength, a small pore size, and excellent homogeneity, the uniaxial stretching step preferably satisfies a stretch ratio of 2 to 50 times, more preferably 5 to 30 times.

In order to provide a porous body having high strength, a small pore size, and excellent homogeneity, the stretching temperature in the uniaxial stretching step is preferably room temperature to a temperature lower than the primary melting point, more preferably 200° C. to 330° C., still more preferably 250° C. to 300° C.

In order to provide a porous body having high strength, a small pore size, and excellent homogeneity, the stretching rate in the uniaxial stretching step is preferably 5 to 2000%/sec, more preferably 7 to 1000%/sec, still more preferably 10 to 700%/sec.

The uniaxial stretching may be performed by any method. Examples of the method in the industrial context include roll stretching and hot-plate stretching.

In order to provide a porous body having high strength, a small pore size, and excellent homogeneity, the stretch ratio in the biaxial stretching step is preferably 2 to 100 times, more preferably 10 to 50 times.

In order to provide a porous body having high strength, a small pore size, and excellent homogeneity, the stretching temperature in the biaxial stretching step is preferably room temperature to 400° C., more preferably 150° C. to 390° C., still more preferably 200° C. to 380° C.

In order to provide a porous body having high strength, a small pore size, and excellent homogeneity, the stretching rate in the biaxial stretching step is preferably 5 to 1000%/sec, more preferably 7 to 700%/sec, still more preferably 10 to 600%/sec.

In order to provide a porous body having high strength, a small pore size, and excellent homogeneity, the production method preferably includes a heat-setting step after the biaxial stretching step. The heat-setting temperature is preferably 300° C. to 420° C., more preferably 350° C. to 400° C.

The biaxial stretching may be performed by any method, and may be performed by a method using a tenter, for example.

Since the porous body of the present invention has high strength and good homogeneity while maintaining a high porosity, it can be suitably used as a filter material for microfiltration membranes, such as air filters and liquid chemical filters, or a support member for polymer electrolyte membranes. The porous body of the present invention is also useful as a material of products used in the fields of semiconductors, of textiles, of medical treatment, of electrochemistry, of sealants, of air filters, of air supply/ventilation/internal pressure adjustment, of liquid filters, of water treatment, and of consumer goods.

The following will provide specific applications.

Electrochemical Field Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), absorbent-attached filters (for HDD embedment), absorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as containers for freeze drying, ventilation materials for automobiles for electronic circuits and lamps, applications relating to containers such as container caps, protective ventilation for electronic devices, and ventilation for medical treatment.

Liquid Filter Field

Examples of the applications in this field include liquid filters for semiconductors (for production of semiconductors), hydrophilic PTFE filters (for production of semiconductors), filters for chemicals (for liquid chemical treatment), filters for pure water production lines (for production of pure water), and back-washing liquid filters (for treatment of industrial drainage).

Consumer Goods Field

Examples of the applications in this field include clothes (for consumer clothes), cable guides (movable wires for motor bikes), clothes for motor cyclists (for consumer clothes), cast liners (medical supporters), filters for cleaners, bagpipes (musical instrument), cables (signal cables for guitars), and strings (for string instrument).

Textile Field

Examples of the applications in this field include PTFE fibers (fiber materials), machine threads (textiles), weaving yarns (textiles), and ropes.

Medical Treatment Field

Examples of the applications in this field include implants (extending articles), artificial blood vessels, catheters, general surgical operations (tissue reinforcing materials), products for head and neck (dura mater alternatives), oral health (tissue regenerative medicine), and orthopedics (bandages).

Since the porous body of the present invention shows a low pressure loss, it is particularly useful as a filter material for air filters such as ULPA filters, HEPA filters, and middle-performance filters.

Since the porous body of the present invention has high strength, a small pore size, and excellent homogeneity, it can be suitably used as a filter such as a liquid chemical filter or an air filter. In other words, a filter material for filters comprising the porous body is also one aspect of the present invention.

The filter material for filters may consist only of the porous body, or may be a laminate of the porous body and any other material.

In order to improve the handleability, for example, at least one surface is preferably reinforced with an air-permeable support member. The air-permeable support member refers to a member that supports the porous body and is preferably bonded to the porous body. The support member may be any of those having air permeability and capable of supporting the porous body, and is preferably nonwoven fabric.

Examples of such nonwoven fabric include nonwoven fabric of polyethylene terephthalate (PET) fiber, nonwoven fabric of polybutylene terephthalate (PBT) fiber, core-shell structured nonwoven fabric comprising a PET core and a polyethylene (PE) shell (PET-core/PE-shell nonwoven fabric), core-shell structured nonwoven fabric comprising a PET core and a PBT shell (PET-core/PBT-shell nonwoven fabric), core-shell structured nonwoven fabric comprising a high melting point PET core and a low melting point PET shell (high melting point PET core/low melting point PET shell nonwoven fabric), nonwoven fabric comprising composite fiber of PET fiber and PBT fiber, and nonwoven fabric comprising composite fiber of high melting point PET fiber and low melting point PET fiber. In order not to hinder the effects of the present invention, the support member preferably has high air permeability and a low pressure loss.

As mentioned above, the performance of the filter material is mainly attributed to the performance of the porous body comprising polytetrafluoroethylene, and a sufficiently large amount of dust can be kept (captured) even without a support member that has a pre-filtering function as a support member. Still, in order to increase the amount of dust to be kept, melt-blown nonwoven fabric may be used as a support member.

The support member preferably has a pore size that is larger than the pore size of the porous body. The grammage of nonwoven fabric used as the support member is usually 10 to 600 g/m$^2$, preferably 15 to 300 g/m$^2$, more preferably 15 to 100 g/m$^2$. The nonwoven fabric used as the support member preferably has a thickness of 0.10 to 0.52 mm. In order to maintain the amount of dust to be kept, an air-permeable support member (for example, any known means for maintaining the amount of dust to be kept disclosed in JP 2000-300921 A, JP 2008-525692 T, and U.S. Pat. No. 6,808,553 B) that can keep a large amount of dust may be applied upstream the air flow.

Another aspect of the present invention is a filter unit comprising the filter material for filters and a frame that holds the filter material for filters.

Since the porous body of the present invention has high strength, a small pore size, and excellent homogeneity, it can be suitably used as a fibrous article. In other words, the porous body of the present invention is also preferably a porous fiber.

Since the porous body of the present invention has high strength, a small pore size, and excellent homogeneity, it can be suitably used as a porous hollow fiber used in, for example, the medical field.

In other words, the porous body of the present invention is also preferably a porous hollow fiber.

The porous hollow fiber can be used in not only the medical field but also, as a hollow fiber microfiltration membrane, a wide variety of fields such as the semiconductor and FPD field, battery field, washing field, biomass-related field, inner filter field for measurement devices and printing devices, polluted water treatment field, liquid-waste treatment field, chemical plant field, and foods field such as drinking water, soft drinks, and liquors.

Another aspect of the present invention is a polymer electrolyte membrane comprising the porous body.

If the porous body is used in a polymer electrolyte membrane, the average pore size thereof is preferably 2.00 µm or smaller, more preferably 1.00 µm or smaller.

If higher membranes strength is required, the average pore size is preferably small. Thus, the average pore size is still more preferably 0.60 µm or smaller, particularly preferably 0.40 µm or smaller.

The average pore size is preferably 0.05 µm or larger, more preferably 0.10 µm or larger, still more preferably 0.20 µm or larger.

The polymer electrolyte can be a known polymer used as a solid polymer electrolyte for polymer electrolyte fuel cells.

The polymer electrolyte may be any one, and is preferably a perfluorocarbon polymeric compound having an ion-exchange group or a hydrocarbon polymeric compound which has an aromatic ring in the molecule, which is partially fluorinated, and to which an ion-exchange group is introduced. For good chemical stability, a perfluorocarbon polymeric compound having an ion-exchange group is more preferred.

The polymer electrolyte preferably has an equivalent weight (EW), i.e., a dry weight per equivalent of the ion-exchange group, of 250 or more and 1500 or less.

The upper limit of the EW value is more preferably 900, still more preferably 700, particularly preferably 600, even more preferably 500.

The lower limit of the EW value is more preferably 300, still more preferably 350, particularly preferably 400.

The EW value is preferably smaller because the conductivity becomes higher. In contrast, the solubility in hot water may be disadvantageously high. Thus, the EW value is preferably within the above appropriate range.

With a low-EW polymer electrolyte, the dimension of the polymer electrolyte membrane greatly changes, so that the durability tends to be poor in an environment at high temperature with a great humidity change, for example, in a fuel cell vehicle in operation. On the contrary, since the polymer electrolyte membrane of the present invention comprises the porous body, the dimension thereof is less likely to change and excellent durability and reliability can be achieved even with a low-EW polymer electrolyte.

The polymer electrolyte preferably has a proton conductivity at 110° C. and a relative humidity of 80% RH of 0.10 S/cm or higher. More preferably, the proton conductivity at 60% RH is 0.05 S/cm or higher, still more preferably the proton conductivity at 40% RH is 0.02 S/cm or higher, even more preferably the proton conductivity at 30% RH is 0.01 S/cm or higher.

The proton conductivity of the polymer electrolyte is preferably as high as possible. For example, the proton conductivity at 110° C. and a relative humidity of 50% RH may be 1.0 S/cm or lower.

The polymer electrolyte preferably satisfies a distance between ion clusters at 25° C. and 50% RH of 0.1 nm or longer and 2.6 nm or shorter. If the distance between ion clusters is 2.6 nm or shorter, the conductivity becomes drastically high.

The upper limit of the distance between ion clusters is more preferably 2.5 nm. The lower limit of the distance between ion clusters is more preferably 0.5 nm, still more preferably 1.0 nm, particularly preferably 2.0 nm.

For example, a fluoropolymer electrolyte satisfying a distance between ion clusters within the above range has a unique ion cluster structure. The fluoropolymer electrolyte will be described later.

The ion cluster means an ion channel formed by an aggregate of multiple proton exchange groups, and per-fluoro-type proton exchange membranes, typified by Nafion, are considered to have such an ion cluster structure (for example, see Gierke, T. D., Munn, G. E., Wilson, F. C., J. Polymer Sci., Polymer Phys, 1981, 19, p. 1687).

The distance d between ion clusters can be measured and calculated by the following method.

The produced polymer electrolyte is subjected to small-angle X-ray scattering measurement in an atmosphere of 25° C. and 50% RH. The resulting scattering intensities are plotted in relation to the Bragg angles θ, and the Bragg angle θm at the peak position derived from the cluster structure usually appearing at 2θ>1° is calculated. Based on the θm value, the distance d between ion clusters is calculated using the following formula (1):

$$d=\lambda/2/\sin(\theta m) \quad (1)$$

wherein λ represents an incident X-ray wavelength.

If the membrane is produced by casting, the membrane is annealed at 160° C. before the measurement. In the case of the fluoropolymer electrolyte to be mentioned later, the electrolyte is treated such that an end group that is a COOZ group or a $SO_3Z$ group is converted into COOH or $SO_3H$. The sample membrane is kept in an atmosphere at 25° C. and 50% RH for 30 minutes or longer before the measurement.

In the fluoropolymer electrolyte, the distance between ion clusters is short. Thus, protons are considered to easily move among the ion clusters, showing a high conductivity even at low humidity.

The polymer electrolyte is preferably a fluoropolymer electrolyte, and the fluoropolymer electrolyte is preferably one having a monomer unit that contains a COOZ group or a $SO_3Z$ group (wherein Z represents an alkali metal, an alkaline earth metal, hydrogen, or $NR^1R^2R^3R^4$, where $R^1$, $R^2$, $R^3$, and $R^4$ each individually represent a C1-C3 alkyl group or hydrogen).

In the fluoropolymer electrolyte, the proportion of the COOZ or $SO_3Z$ group-containing monomer unit is preferably 10 to 95 mol % in all the monomer units. The phrase "all the monomer units" herein means all the portions derived from monomers in the molecular structure of the fluoropolymer electrolyte.

The COOZ or SO$_3$Z group-containing monomer unit is typically derived from a COOZ or SO$_3$Z group-containing monomer represented by the following formula (I):

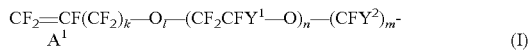
(I)

wherein Y$^1$ represents F (a fluorine atom), Cl (a chlorine atom), or a perfluoroalkyl group; k is an integer of 0 to 2, l is 0 or 1, n is an integer of 0 to 8, n Y$^1$s may be the same as or different from each other; Y$^2$ represents F or Cl; m is an integer of 0 to 12, if m=0, l=0 and n=0, m Y$^2$s may be the same as or different from each other; A$^1$ represents COOZ or SO$_3$Z (wherein Z represents an alkali metal, an alkaline earth metal, hydrogen, or NR$^1$R$^2$R$^3$R$^4$, where R$^1$, R$^2$, R$^3$, and R$^4$ each individually represent a C1-C3 alkyl group or hydrogen).

In the formula (I), Y$^1$ is preferably F or —CF$_3$, more preferably F.

A$^l$ is preferably —SO$_3$Z, more preferably —SO$_3$H.

Preferably, m is an integer of 0 to 6.

For good synthesis and handleability, in the formula (I), k is more preferably 0, 1 is more preferably 1, and n is more preferably 0 or 1, n is still more preferably 0.

More preferably, Y$^2$ is F and m is an integer of 2 to 6, still more preferably Y$^2$ is F and m is 2 or 4, particularly preferably Y$^2$ is F and m is 2.

In the fluoropolymer electrolyte, one COOZ or SO$_3$Z group-containing monomer may be used or two or more thereof may be used in combination.

The fluoropolymer electrolyte is preferably a copolymer including a repeating unit (α) derived from the COOZ or SO$_3$Z group-containing monomer and a repeating unit (β) derived from an ethylenic fluoromonomer copolymerizable with the COOZ or SO$_3$Z group-containing monomer.

The ethylenic fluoromonomer to constitute the repeating unit (β) is a monomer that is free from ether oxygen (—O—) and has a vinyl group, and part or all of the hydrogen atoms in the vinyl group may optionally be replaced by fluorine atoms.

The term "ether oxygen" herein means a —O— structure constituting the monomer molecule.

Examples of the ethylenic fluoromonomer include haloethylenic fluoromonomers represented by the following formula (TI):

$$CF_2=CF-Rf^1 \qquad (II)$$

(wherein Rf$^1$ represents F, Cl, or a C1-C9 linear or branched fluoroalkyl group), or hydrogen-containing fluoroethylenic fluoromonomers represented by the following formula (III):

$$CHY^3=CFY^4 \qquad (III)$$

(wherein Y$^3$ represents H or F, and Y$^4$ represents H, F, Cl, or a C1-C9 linear or branched fluoroalkyl group).

The ethylenic fluoromonomer may be tetrafluoroethylene (TFE), hexafluoropropylene (HFP), chlorotrifluoroethylene (CTFE), vinyl fluoride, vinylidene fluoride (VDF), trifluoroethylene, hexafluoroisobutylene, perfluorobutylethylene, or the like. It is preferably TFE, VDF, CTFE, trifluoroethylene, vinyl fluoride, or HFP, more preferably TFE, CTFE, or HFP, still more preferably TFE or HFP, particularly preferably TFE. One of the ethylenic fluoromonomers may be used or two or more thereof may be used in combination.

The fluoropolymer electrolyte is preferably a copolymer comprising 10 to 95 mol % of the repeating unit (α) derived from the COOZ or SO$_3$Z group-containing monomer, to 90 mol % of the repeating unit (β) derived from the ethylenic fluoromonomer, the sum of the proportions of the repeating unit (α) and the repeating unit (β) being 95 to 100 mol %.

The lower limit of the proportion of the repeating unit (α) derived from the COOZ or SO$_3$Z group-containing monomer is more preferably 15 mol %, still more preferably mol %, whereas the upper limit thereof is more preferably 60 mol %, still more preferably 50 mol %.

The lower limit of the proportion of the repeating unit (β) derived from the ethylenic fluoromonomer is more preferably 35 mol %, still more preferably 45 mol %, whereas the upper limit thereof is more preferably 85 mol %, still more preferably 80 mol %.

The fluoropolymer electrolyte is preferably a copolymer containing a repeating unit derived from the COOZ or SO$_3$Z group-containing monomer represented by the formula (I) and a repeating unit derived from TFE.

The fluoropolymer electrolyte may contain, as a repeating unit derived from a third monomer other than the above components, a repeating unit (γ) derived from vinyl ether other than the COOZ or SO$_3$Z group-containing monomer, and the proportion thereof is preferably 0 to 5 mol %, more preferably 4 mol % or less, still more preferably 3 mol % or less.

The polymer composition of the fluoropolymer electrolyte can be calculated from the measured value in melt-state NMR at 300° C., for example.

The vinyl ether other than the COOZ or SO$_3$Z group-containing monomer to constitute the repeating unit (γ) may be any one containing neither the COOZ group nor the SO$_3$Z group, and examples thereof include fluorovinyl ethers represented by the following formula (IV):

$$CF_2=CF-O-Rf^2 \qquad (IV)$$

(wherein Rf$^2$ represents a C1-C9 fluoroalkyl group or a C1-C9 fluoropolyether group), more preferably perfluorovinyl ether, or hydrogen-containing vinyl ethers represented by the following formula (V):

$$CHY^5=CF-O-Rf^3 \qquad (V)$$

(wherein Y$^5$ represents H or F, and Rf$^3$ represents a C1-C9 linear or branched fluoroalkyl group that may optionally have an ether group). One of the vinyl ethers may be used or two or more thereof may be used.

The polymer electrolyte can be produced by any conventionally known method. For example, the polymer electrolyte can be produced by the method disclosed in WO 2009/116446.

The polymer electrolyte membrane of the present invention preferably has a thickness of 1 μm or larger and 500 μm or smaller, more preferably 2 μm or larger and 100 μm or smaller, still more preferably 5 μm or larger and 50 μm or smaller. If the thickness is small, the direct current resistance upon power generation can be low. In contrast, the amount of gas permeated may be large. Thus, the thickness is preferably within the above appropriate range.

The polymer electrolyte membrane of the present invention can be made thin while maintaining its excellent durability by the use of the porous body.

Next, the production method for the polymer electrolyte membrane of the present invention will be described below.

(Production Method for Polymer Electrolyte Membrane)

The polymer electrolyte membrane of the present invention can be produced by immersing the porous body into a polymer electrolyte solution to be mentioned later or applying the polymer electrolyte solution to the porous body. The immersion or the application is preferably followed by drying.

Examples of the immersion method include dip coating.

Examples of the application method include a slot die technique, and coating techniques disclosed in JP H11-501964 T, such as forward roll coating, reverse roll coating, gravure coating, knife coating, kiss coating, and spray coating. The coating technique can be appropriately selected from these techniques in accordance with the thickness of a layer of the coating liquid to be formed, the material properties of the coating liquid, coating conditions, and the like.

The drying removes a solvent constituting the polymer electrolyte solution. The drying may be performed at room temperature or under heating.

The drying is preferably performed under heating, preferably under heating at 50° C. to 350° C., for example.

One example of a more specific method for producing the polymer electrolyte membrane of the present invention is a method including: forming a film of a polymer electrolyte solution on a long and narrow casting substrate (sheet) in a state of moving or being left to stand; bringing a long and narrow porous body into contact with the solution to form an unfinished composite structure; drying the unfinished composite structure in, for example, a hot-air circulating chamber; and forming another film of the polymer electrolyte solution on the dried unfinished composite structure to provide a polymer electrolyte membrane.

In order to improve the conductivity and the mechanical strength of the polymer electrolyte membrane, one or more layers containing a polymer electrolyte may be formed on at least one main surface of the thus-produced polymer electrolyte membrane.

Further, the compounds contained therein may be cross-linked with each other by means of a cross-linker, ultraviolet rays, electron beams, radial rays, or the like.

(Polymer Electrolyte Solution)

The polymer electrolyte solution can be produced by dissolving or suspending the polymer electrolyte in an appropriate solvent (a solvent having good affinity with resin).

Examples of an appropriate solvent include water, protonic organic solvents such as ethanol, methanol, n-propanol, isopropyl alcohol, butanol, and glycerin, and aprotic solvents such as N,N-dimethylformamide, N,N-dimethylacetamide, and N-methylpyrrolidone. One of these may be used alone or two or more of these may be used in combination. If one solvent is used alone, water is preferred. If two or more solvents are used in combination, a solvent mixture of water and a protonic organic solvent is particularly preferred.

The dissolution or suspension can be achieved by any method. For example, a polymer electrolyte is first added to a solvent mixture of water and a protonic organic solvent such that the total solid content is 1 to 50 mass %. Next, this composition is put into an autoclave having a glass inner cylinder, if necessary, and the atmosphere inside the cylinder is purged with inert gas such as nitrogen. Then, the system is heated under stirring for 1 to 12 hours at an internal temperature of 50° C. to 250° C. Thereby, a solution or a suspension is obtained. The total solid content is preferably as high as possible for higher yield. Still, too high a concentration may cause undissolved matter. Thus, the total solid content is preferably 1 to 50 mass %, more preferably 3 to 40 mass %, still preferably 5 to 30 mass %.

If a protonic organic solvent is used, the ratio between water and the protonic organic solvent can be appropriately selected in accordance with the dissolving method, the dissolving conditions, the type of a polymer electrolyte, the total solid content, the dissolving temperature, the stirring speed, and the like. The mass ratio of the protonic organic solvent to water is preferably 0.1 to 10 of protonic organic solvent to 1 of water, particularly preferably 0.1 to 5 of the organic solvent to 1 of water.

Such a solution or suspension includes one or two or more of emulsion (in which liquid particles are dispersed as colloidal particles or more coarse particles in liquid to be in the state of emulsion), suspension (in which solid particles are dispersed as colloidal particles or particles having a size to be observed through a microscope in liquid), colloidal liquid (in which macromolecules are dispersed), micellar liquid (which is a lyophilic colloids dispersion formed by association of many small molecules by intermolecular force), and the like.

Also, such a solution or suspension can be concentrated. The concentration may be achieved by any method. Examples thereof include a method of heating the solution or suspension to evaporate the solvent and a method of concentrating the solution or suspension under reduced pressure. If the resulting coating solution has too high a solid concentration, it may have a high viscosity and be difficult to handle. If the resulting coating solution has too low a solid concentration, the productivity thereof may be poor. Thus, the final solid concentration of the coating solution is preferably 0.5 to 50 mass %.

In order to remove coarse particles, the resulting solution or suspension is more preferably filtered. The filtration may be performed by any method, such as conventionally performed usual methods. One typical example of the method is pressure filtration using a filter obtained by processing a filter material having a filtration rating usually used. The filter is preferably a filter material whose 90% capture particle size is 10 to 100 times the average particle size of the particles. This filter material may be filter paper or may be a filter material such as a metal-sintered filter. In the case of filter paper, the 90% capture particle size thereof is preferably 10 to 50 times the average particle size of the particles. In the case of a metal-sintered filter, the 90% capture particle size thereof is preferably 50 to 100 times the average particle size of the particles. Adjusting the 90% capture particle size to 10 or more times the average particle size possibly enables suppression of an excessive increase in a pressure for liquid delivery and suppression of filter clogging in a short time. In contrast, adjusting the 90% capture particle size to 100 or less times the average particle size is preferred in order to favorably remove aggregates of the particles or undissolved resin that may cause foreign matters in the resulting film.

The present invention also relates to a membrane electrode assembly comprising the polymer electrolyte membrane. A unit comprising an electrolyte membrane and two electrode catalyst layers that are an anode and a cathode and joined to the respective surfaces of the membrane is called a membrane electrode assembly (hereinafter, also abbreviated as "MEA"). The MEA may also include those prepared by oppositely joining a pair of gas diffusion layers to the outer surfaces of the electrode catalyst layers.

The electrode catalyst layers each comprise fine particles of a catalyst metal and a conducting agent that bears the catalyst metal, and a water repellant, if necessary. The catalyst used for the electrodes may be any metal that promotes oxidation of hydrogen and reduction of oxygen, and examples thereof include platinum, gold, silver, palladium, iridium, rhodium, ruthenium, iron, cobalt, nickel, chromium, tungsten, manganese, vanadium, and any alloy thereof. In particular, platinum is mainly used.

The amount of the electrode catalyst supported relative to the electrode area is, in the form of an electrode catalyst layer, preferably 0.001 to 10 mg/cm², more preferably 0.01 to 5 mg/cm², most preferably 0.1 to 1 mg/cm².

The resulting MEA, in some cases the MEA with a pair of gas diffusion electrodes disposed on the opposite sides, is combined with constitutional elements used in usual polymer electrolyte fuel cells, such as a bipolar plate and a backing plate, and thereby a polymer electrolyte fuel cell is produced. The present invention also relates to a polymer electrolyte fuel cell comprising the membrane electrode assembly.

The bipolar plate means a plate of a composite material of graphite and resin or a plate of metal having on its surface a channel for flowing fuel or gas such as an oxidizing agent. The bipolar plate has not only a function of delivering electrons to an external load circuit but also a function as a channel for supplying fuel or an oxidizing agent to the vicinity of the electrode catalyst. Intercalation of an MEA between such bipolar plates and the resulting stack of multiple layers lead to a fuel cell.

Usual biaxially stretched PTFE membranes are roughened with "naps" of fibrils during stretching, and thus have poor smoothness on the surfaces and feel sticky. These "naps" are entangled with each other, which causes the biaxially stretched PTFE membranes to be in a state of being stuck to each other. When such a film is formed into a long rolled article, a blocking phenomenon occurs at the center portion of the roll where the rolling pressure is strong, and thus the film is difficult to stably draw out for lamination or the like processing.

On the contrary, the porous body of the present invention can suppress generation of "naps". Since the porous body of the present invention has a smooth and flat, slipping surface, and has a lower coefficient of kinetic friction and a lower coefficient of static friction than conventional biaxially stretched PTFE membranes. Thus, it is easy to handle in processing.

Further, the porous body of the present invention has a high fiber density, which is one of unprecedented characteristics.

EXAMPLES

In examples, the respective physical properties are determined by the following methods.

(1) Polymer Concentration

Polytetrafluoroethylene aqueous dispersion (1 g) is dried at 150° C. for 30 minutes in a blowing dryer. The percentage of the mass of the nonvolatile matter to the mass (1 g) of the aqueous dispersion is defined as a polymer solid concentration.

(2) Average Primary Particle Size

A polytetrafluoroethylene aqueous dispersion is diluted with water to have a solid concentration of 0.15 mass %. Then, the transmittance of incident light at 550 nm relative to the unit length of the resulting diluted latex is determined and the number-based length average particle size is determined by measuring the Feret diameter in a transmission electron microscopic image. Based on these values, a calibration curve is drawn. Using this calibration curve, the average primary particle size is determined from the measured transmittance of incident light at 550 nm of each sample.

(3) Amount of Trace Comonomer (PMVE)

Non-melt-fabricable PTFE fine powder is molten at high temperature and is subjected to F19-NMR measurement.

The amount of the trace comonomer is calculated from the signals assigned to functional groups in the resulting trace comonomer.

For example, the amount of PMVE used in the examples of the present application was calculated by $F^{19}$-NMR measurement at 360° C. using the following formula:

$$\text{Amount of trace comonomer (mol \%)} = (4B/3)/(A+(B/3)) \times 100$$

wherein A=sum of $CF_2$ signal and CF signal around −118 ppm; and B=integral value of $CF_3$ signal assigned to PMVE around −52 ppm.

(4) Standard Specific Gravity (SSG)

A sample is produced in conformity with ASTM D4895-89, and the specific gravity of the resulting sample is measured by the water replacement method.

(5) Extrusion Pressure

In conformity with JP 2002-201217 A, 100 g of PTFE fine powder is first left to stand at room temperature for two hours or longer. The powder is blended with 21.7 g of a lubricant (trade name: Isopar H (registered tradename), Exxon Mobil Corp.) for three minutes. Thereby, a PTFE fine powder mixture is obtained.

The resulting PTFE fine powder mixture is left to stand for two hours in a 25° C. temperature-constant chamber, and then paste-extruded through an orifice (diameter: 2.5 mm, land length: 1.1 cmm, introduction angle: 30°) at a reduction ratio (ratio between the cross-sectional area of the inlet of the die and the cross-sectional area of the outlet thereof) of 100, an extrusion rate of 51 cm/min, and 25° C. Thereby, beading is obtained.

The extrusion pressure is a value determined by measuring a load when the extrusion load reaches equilibrium during the paste extrusion, and then dividing the measured load by the cross-sectional area of a cylinder used in the paste extrusion.

(6) Breaking Strength

The extrusion beading is subjected to a stretching test in the following method in conformity with JP 2002-201217 A, and thereby a sample for breaking strength measurement is produced.

The beading obtained by the paste extrusion is dried at 230° C. for 30 minutes so that the lubricant is removed. The dried beading is cut into an appropriate length and the cut beading is held at its ends by clamps with a gap between the clamps of 5.1 cm. The beading is then heated at 300° C. in an air-circulation furnace, and the clamps are moved apart from each other at a stretching rate of 100%/sec until the distance between the clamps corresponds to a total stretch of 2400%. Thereby, the stretching test is performed. The "total stretch" refers to the rate of increase in the length of the beading by the stretching based on the length of the beading (100%) before the stretch test.

The stretched beading prepared under the aforementioned stretching conditions is cut into an appropriate length, and the cut beading is fixed by movable jaws with a gauge length of 5.0 cm. The movable jaws are driven at a speed of 300 mm/min, and the breaking strength is measured using a tensile tester at room temperature. The minimum tensile load (force) at break among the tensile loads at break of three samples obtained from the stretched beading, i.e., two samples from the respective ends of the stretched beading (excluding the neck down within the range of the clamps, if exist), and one sample from the center thereof, is defined as the breaking strength.

(7) Grammage

The mass (g) of a rectangular sample with a size of 4.0 cm×12.0 cm is measured using a precision scale, and the mass is divided by the area (0.0048 m$^2$). The quotient is defined as the grammage.

(8) Film Density

The mass of a rectangular sample with a size of 4.0 cm×12.0 cm is measured using a precision scale. Using the measured mass and the thickness, the film density is calculated by the following formula:

$$\rho = M/(4.0 \times 12.0 \times t)$$

wherein
$\rho$=film density (g/cm$^3$)
M=mass (g)
t=thickness (cm).

The measurement and the calculation are performed at three points, and the average value thereof is defined as the film density.

(9) Porosity

The porosity is determined by the following formula using the film density and the PTFE true density (2.2 g/cm$^3$):

$$\text{Porosity} = 1 - (\text{film density}/\text{PTFE true density})$$

wherein the PTFE true density is 2.2 g/cm$^3$.

(10) Thickness

Five biaxially stretched porous membranes are stacked and the total thickness is measured using a thickness meter, and the measured value is divided by 5. The quotient is defined as the thickness of one biaxially stretched porous membrane.

(11) Matrix Tensile Strength (Vertical and Lateral)

Based on the vertical matrix tensile strength and the lateral matrix tensile strength determined by the following methods, the "product of the vertical and lateral matrix tensile strengths" is determined.

(Vertical Matrix Tensile Strength)

First, five samples were cut out of a biaxially stretched porous membrane. Each sample has a dimension of 15.0 cm in the machine direction (longitudinal direction, i.e., paste extruding direction) and 2.0 cm in the transverse direction (width direction, i.e., direction perpendicular to the paste extruding direction). For the five samples, the tensile strength in the machine direction was measured, and the maximum loads of the respective five samples were determined.

Next, the largest one and the smallest one of the maximum loads of the five samples were eliminated and an average value of the remaining three values was calculated. This average value is defined as the vertical average maximum load.

The vertical matrix tensile strength is determined by the following formula using the vertical average maximum load, the sample width (2.0 cm), the thickness (unit: cm), and the porosity.

$$\text{Vertical matrix tensile strength} = ((\text{vertical average maximum load})/(2.0 \times \text{thickness}))/(1-\text{porosity}).$$

(Lateral Matrix Tensile Strength)

Five samples were cut out of a biaxially stretched porous membrane. Each sample has a dimension of 2.0 cm in the machine direction (longitudinal direction, i.e., paste extruding direction) and 15.0 cm in the transverse direction (width direction, i.e., direction perpendicular to the paste extruding direction). For the five samples, the tensile strength in the transverse direction was measured, and the maximum loads of the respective five samples were determined.

Next, the lateral average maximum load is calculated in the same manner as in the case of the machine direction, and the lateral matrix tensile strength is determined using the following formula:

$$\text{Lateral matrix tensile strength} = \{(\text{lateral average maximum load})/(2.0 \times \text{thickness})\}/(1-\text{porosity}).$$

In the tensile strength measurement, a tensile tester equipped with a 50 N load cell is used at a chuck length of 5.0 cm and a cross-head speed of 300 mm/min.

(12) Average Pore Size

The mean flow pore size (MFP) was measured in conformity with ASTM F316-86, and this value was defined as the average pore size.

(13) Numbers of Nodes and of Fused Points

An electron microscopic image was taken at a magnification of 10000× using a scanning electron microscope, and the numbers of nodes and fused points observed in an area of 5 μm×5 μm were counted (see FIGS. 5 to 14).

(14) Average Fiber Diameter

An electron microscopic image is taken at a magnification of 10000× using a scanning electron microscope (trade name: SU8020, Hitachi Ltd.), and vertical straight lines and lateral straight lines are drawn in an area of 5 μm×5 μm. The diameters of all the fibers crossing the respective lines are measured using a ruler, and the scales of the resulting values are converted so that the fiber diameters (nm) are determined. Next, all the determined fiber diameters are organized into a frequency distribution in 10 nm. The values are plotted on logarithmic probability paper, and the fiber diameter crossing the 50% probability is defined as the average fiber diameter. The average fiber diameter is correlated to the filter performance.

(15) Number of Fibers

An electron microscopic image was taken at a magnification of 10000× using a scanning electron microscope (trade name: SU8020, Hitachi Ltd.), and vertical straight lines and lateral straight lines were drawn in an area of 5 μm×5 μm. The number of fibers crossing the respective lines was counted.

(16) Fiber Filling Index

An electron microscopic image is taken at a magnification of 10000× using a scanning electron microscope (trade name: SU8020, Hitachi Ltd.), and vertical straight lines and lateral straight lines are drawn in an area of 5 μm×5 μm. The diameters of all the fibers crossing the respective lines are measured using a ruler, and the scales of the resulting values are converted so that the fiber diameters (nm) are determined. Next, all of the fiber diameters determined were added up, and the sum was defined as the fiber filling index. The greater the fiber filling index is, the higher the fiber density is.

Production Example 1

A 6-L stainless steel (SUS316) autoclave provided with a stainless steel (SUS316) anchor stirrer and a temperature control jacket was charged with 3560 ml of deionized water, 104 g of paraffin wax, and 5.4 g of CF$_3$OCF(CF$_3$)CF$_2$OCF(CF$_3$)COONH$_4$ serving as a fluorosurfactant. The system was purged with nitrogen gas three times and with TFE gas twice under heating up to 70° C., so that oxygen was removed. Then, the pressure inside the container was adjusted to 0.60 MPa by TFE gas, the contents were stirred at 250 rpm, and the temperature inside the container was maintained at 70° C.

Next, 0.60 g (if the whole amount was reacted, this amount corresponds to 0.029 mol % (0.049 mass %) based on the whole amount of TFE to be polymerized) of perfluoromethyl vinyl ether (PMVE) was injected with TFE so that the pressure inside the container of the autoclave was adjusted to 0.70 MPa.

An aqueous solution of ammonium persulfate (15.4 mg) in deionized water (20 ml) was injected with TFE so that the pressure inside the container of the autoclave was adjusted to 0.78 MPa, and the polymerization reaction was started.

The pressure inside the container decreased as the polymerization reaction proceeded. Thus, TFE was continually supplied so as to always maintain the pressure inside the container of the autoclave at 0.78±0.05 MPa. The temperature inside the container was maintained at 70° C. and the stirring speed was maintained at 250 rpm.

When 429 g (35.0 mass % relative to the whole amount (1225 g) of TFE to be polymerized) of TFE was consumed, an aqueous solution of hydroquinone (14.32 mg (4.0 ppm relative to the aqueous medium)) serving as a radical scavenger in deionized water (20 ml) was injected with TFE.

The polymerization was further continued. When 1225 g of TFE was consumed, the stirring and the supply of the monomer were stopped. The gas inside the autoclave was immediately released to normal pressure and the reaction was finished. Thereby, an aqueous dispersion A of modified PTFE was obtained.

A trace of the polymer coagulum was observed in the polymerization container.

For the resulting aqueous dispersion, the polymer concentration and the average primary particle size were determined. Table 1 shows the measurement results.

Next, a 6-L coagulation tank provided with a stirrer and a baffle was charged with 3 L of the PTFE aqueous dispersion A diluted with deionized water, and the stirring was started (at 450 rpm).

At this time, an aqueous solution of ammonium hydrogen carbonate was put into the coagulation tank. When the polymer powder was separated from water, the stirring was stopped. The resulting wet powder was filtered, and the residue was washed with deionized water.

The residue was then dried for 18 hours in a hot-air circulating dryer set to 160° C. Thereby, a modified PTFE fine powder A (PTFE-A) was obtained.

The amount of modified PMVE, SSG, extrusion pressure, and breaking strength were measured and evaluated. Table 1 shows the results.

Production Example 2

A homo-PTFE fine powder B (PTFE-B) was obtained in accordance with Comparative Example 3 of WO 2005/061567 A except that the drying temperature was changed to 160° C.

For the resulting PTFE-B, the respective parameters were measured and evaluated. Table 1 shows the results.

Production Example 3

A homo-PTFE fine powder C (PTFE-C) was obtained in accordance with Example 2 of WO 2010/113950 A.

For the resulting PTFE-C, the respective parameters were measured and evaluated. Table 1 shows the results.

Production Example 4

A modified PTFE fine powder D (PTFE-D) was obtained in the same manner as in Production Example 1 except that the amount of PMVE was changed to 0.30 g. For the resulting PTFE-D, the respective parameters were measured and evaluated. Table 1 shows the results.

Production Example 5

A modified PTFE fine powder E (PTFE-E) was obtained in the same manner as in Production Example 4 except that the amount of PMVE was changed to 0.75 g and the drying temperature of the wet powder was changed to 180° C.

For the resulting PTFE-E, the respective parameters were measured and evaluated. Table 1 shows the results.

Production Example 6

A modified PTFE fine powder F (PTFE-F) was obtained in the same manner as in Production Example 5 except that the amount of PMVE was changed to 2.00 g.

For the resulting PTFE-F, the respective parameters were measured and evaluated. Table 1 shows the results.

Production Example 7

A modified PTFE fine powder G (PTFE-G) was obtained in accordance with Production Example 1 of WO 2012/086710 A.

For the resulting PTFE-G, the respective parameters were measured and evaluated. Table 1 shows the results.

TABLE 1

| Parameter | Unit | Production Example 1 | Production Example 2 | Production Example 3 | Production Example 4 | Production Example 5 | Production Example 6 | Production Example 7 |
|---|---|---|---|---|---|---|---|---|
| Polymer concentration | mass % | 25.4 | 25.6 | 30.9 | 25.2 | 25.4 | 25.2 | 30.1 |
| Average primary particle size | nm | 234 | 320 | 339 | 246 | 234 | 229 | 184 |
| Trace comonomer | — | PMVE | — | — | PMVE | PMVE | PMVE | PPVE |
| Amount of trace comonomer | mol % | 0.028 | — | — | 0.015 | 0.035 | 0.091 | 0.056 |
| Standard specific gravity (SSG) | — | 2.145 | 2.158 | 2.152 | 2.148 | 2.144 | 2.136 | 2.158 |
| Extrusion pressure | MPa | 16.3 | 15.8 | 19.1 | 18.0 | 17.5 | 18.5 | 11.7 |
| Breaking strength | N | 30.6 | 28.2 | 35.2 | 34.8 | 32.0 | 30.4 | Broken |

Example 1

Extrusion and Rolling

Hydrocarbon oil ("IP Solvent 2028", Idemitsu Kosan Co., Ltd.), serving as an extrusion aid, was added in an amount of 24 parts by weight for each 100 parts by weight of the modified PTFE fine powder A (PTFE-A) obtained in Production Example 1. The components were mixed and the mixture was left to stand for 12 hours.

The mixture of the fine powder A (PTFE-A) and the extrusion aid were put into a 100 φmm preformer and compressed under a pressure of 3 MPa. Thereby, a preform was obtained. Then, the preform was paste-extruded through an extruder having an inner diameter of 100 mm preliminarily equipped with a die having an inner diameter of 16 mmφ, and thereby a PTFE molded article was obtained.

The resulting PTFE molded article was molded compressed(rolled) into a film shape using a calender roll, and thereby a unsintered PTFE film was obtained.

The hydrocarbon oil was evaporated through a hot-air drying furnace, and thereby a belt-like unsintered PTFE film having an average thickness of about 300 μm was obtained.
(Uniaxial Stretching)

Figure 3:
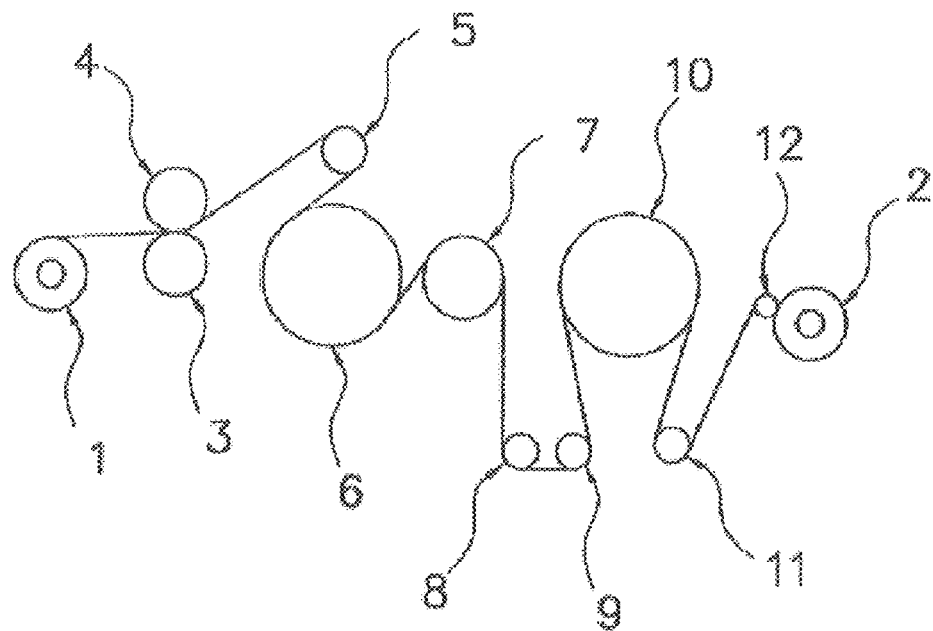
FIG. 3 is a schematic cross-sectional view showing the outline of a roll stretching machine used in examples.

The resulting unsintered PTFE film was stretched in the machine direction at a stretch ratio of five times and a temperature of 300° C. using a stretching device equipped with multiple rolls illustrated in FIG. 3 (uniaxial stretching).

The appearance of the uniaxially stretched film was evaluated. The criteria for evaluating the appearance of the uniaxially stretched film are as follows.

Good: uniform

Acceptable: with defects such as partial breakage or cracking

Poor: with defects such as breakage or cracking on the whole

Further, the strength (in the extrusion direction) of the uniaxially stretched film was measured. The strength of the uniaxially stretched film was measured by the following method.

(Biaxial Stretching)

Figure 4:
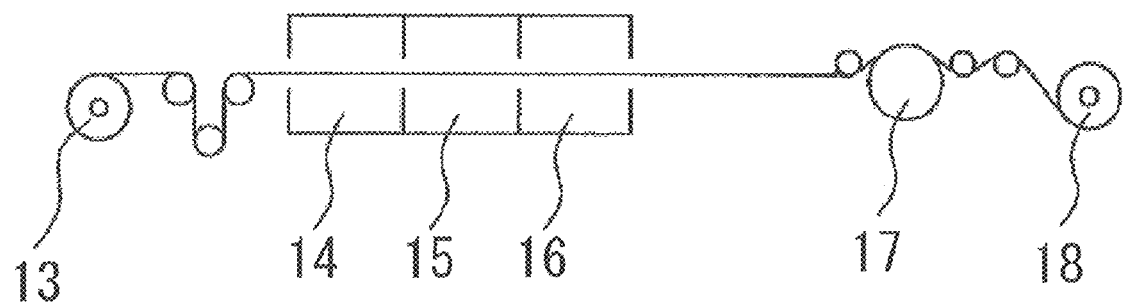
FIG. 4 is a schematic cross-sectional view showing a tenter stretching machine used in examples.
Figure 5:
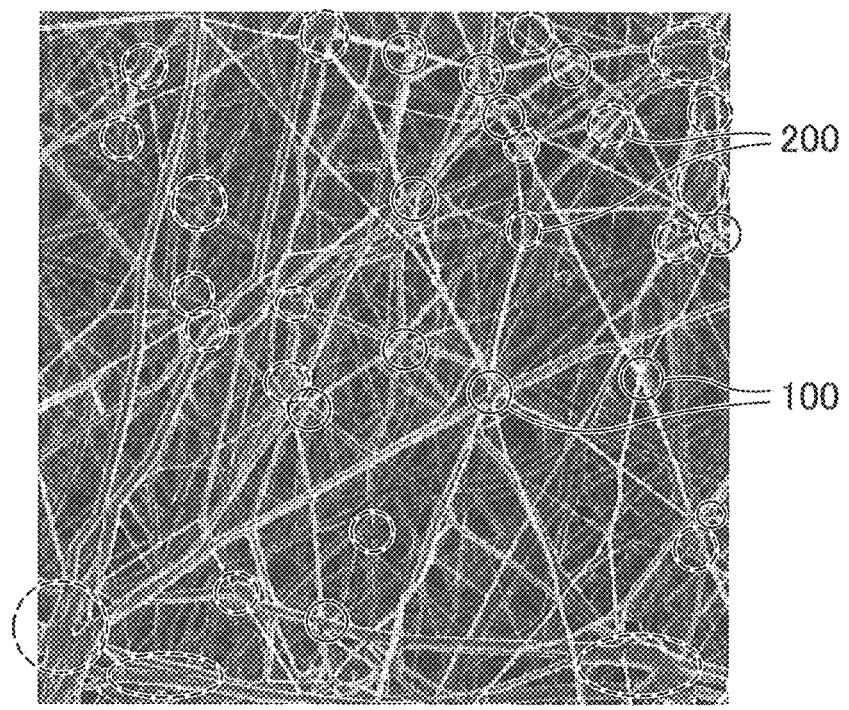
FIG. 5 is an image of a porous membrane obtained in Example 1 using a scanning electron microscope.
Figure 6:
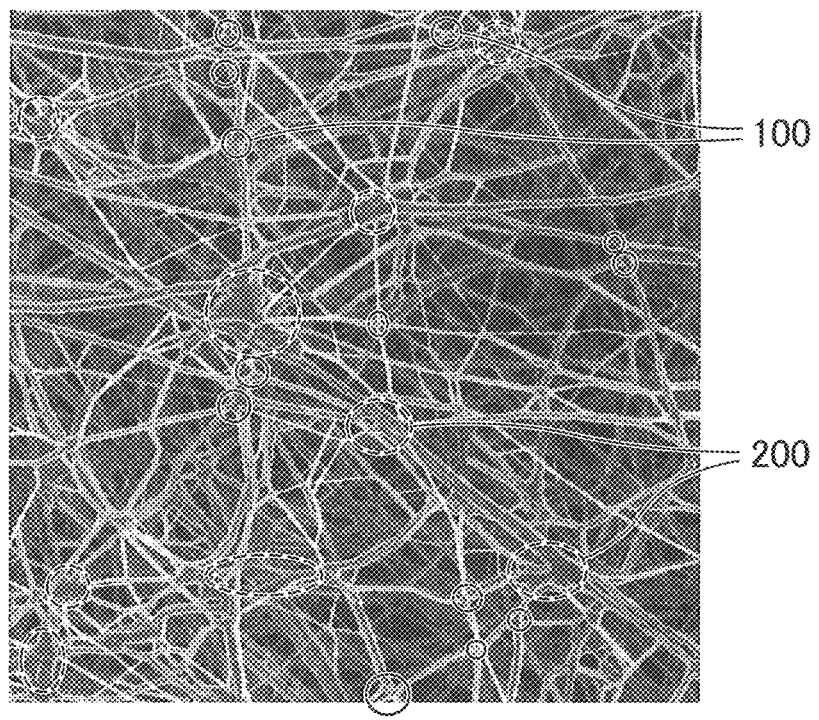
FIG. 6 is an image of a porous membrane obtained in Example 2 using a scanning electron microscope.
Figure 7:
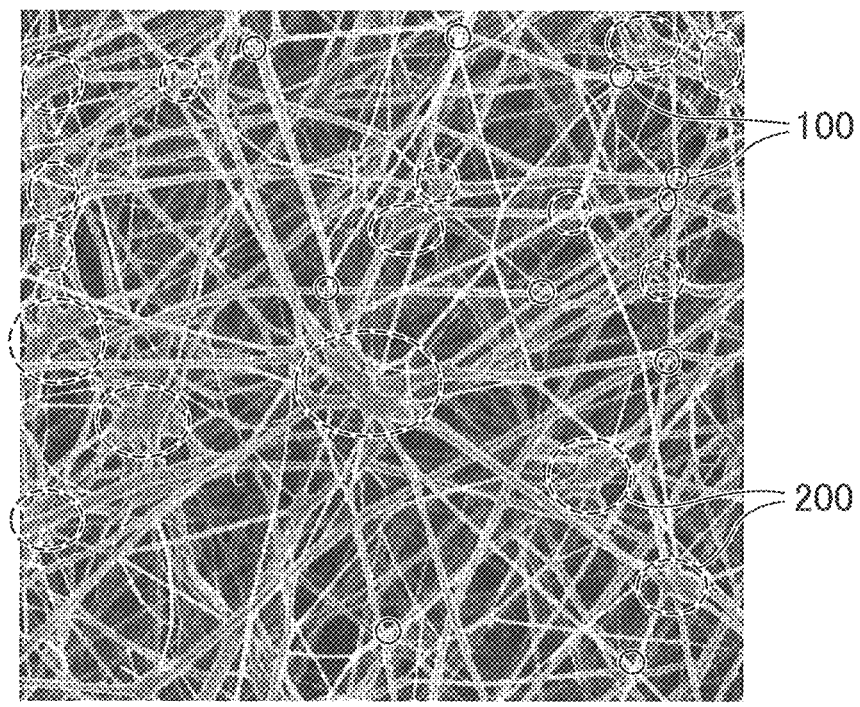
FIG. 7 is an image of a porous membrane obtained in Example 3 using a scanning electron microscope.
Figure 8:
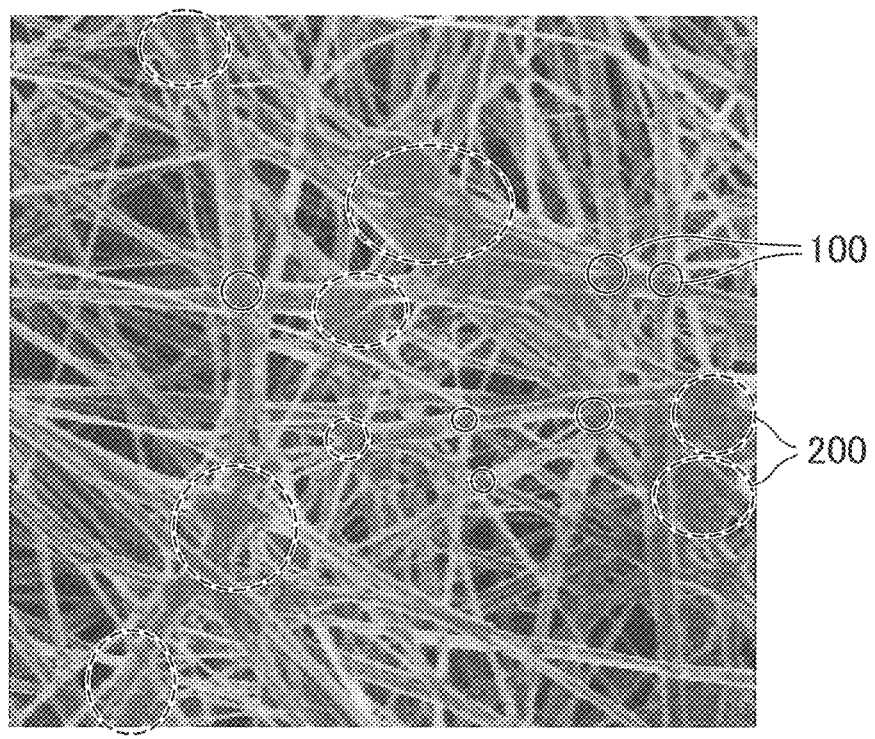
FIG. 8 is an image of a porous membrane obtained in Example 4 using a scanning electron microscope.
Figure 9:
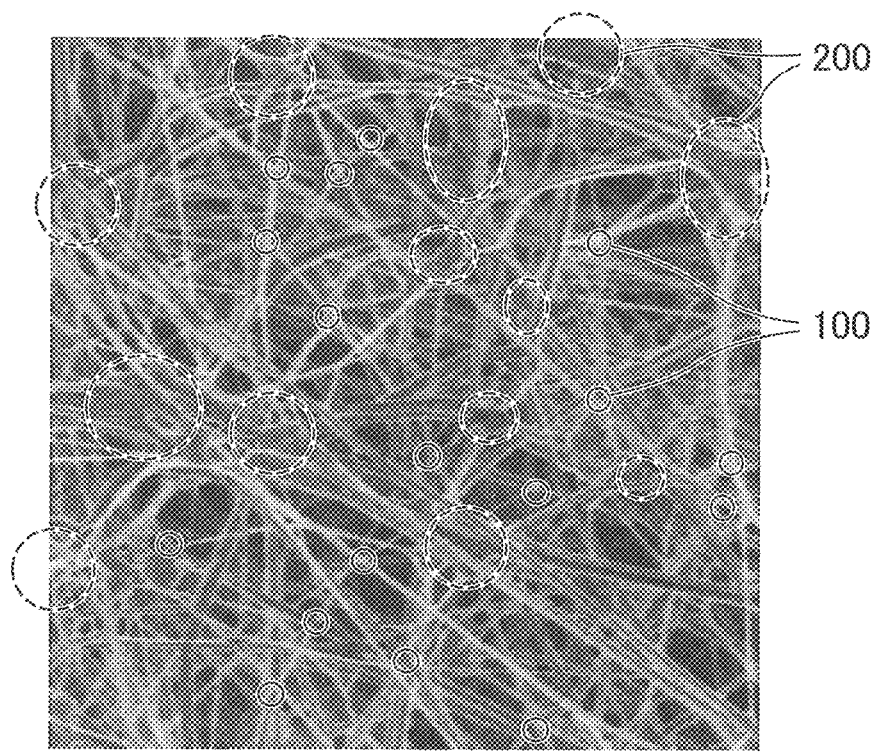
FIG. 9 is an image of a porous membrane obtained in Example 5 using a scanning electron microscope.
Figure 10:
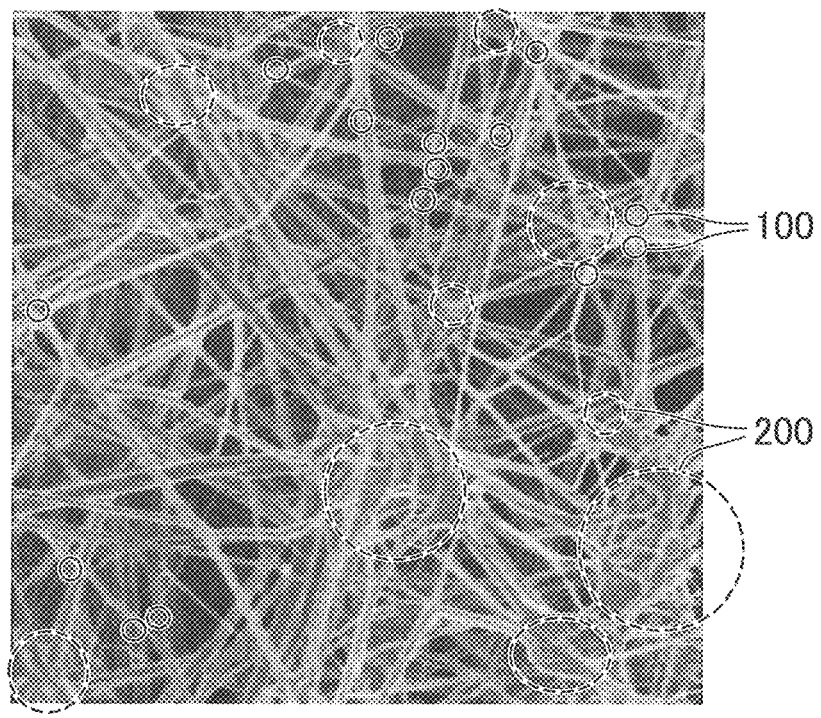
FIG. 10 is an image of a porous membrane obtained in Example 6 using a scanning electron microscope.
Figure 11:
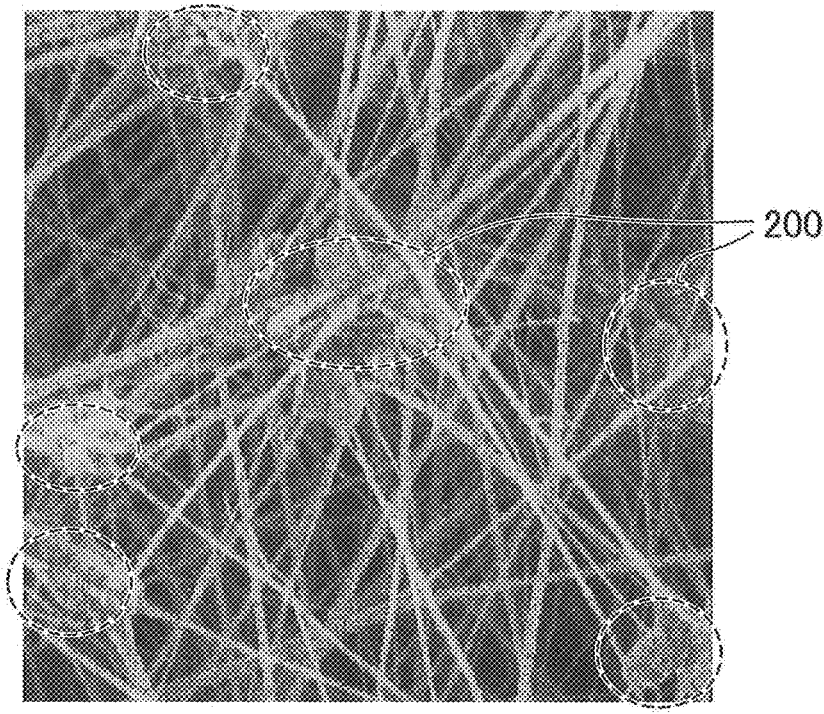
FIG. 11 is an image of a porous membrane obtained in Comparative Example 1 using a scanning electron microscope.
Figure 12:
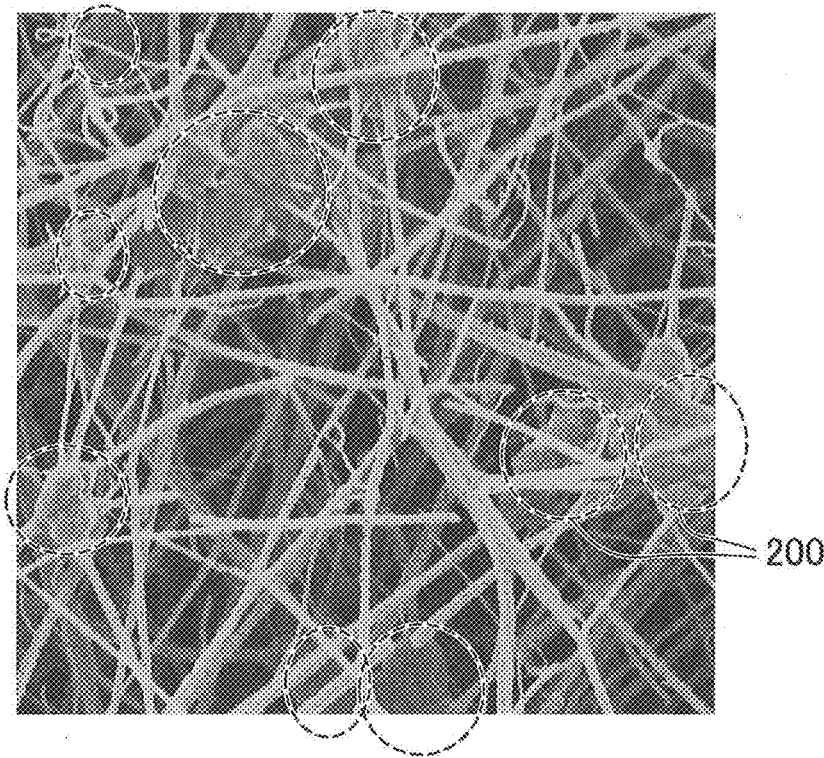
FIG. 12 is an image of a porous membrane obtained in Comparative Example 2 using a scanning electron microscope.
Figure 13:
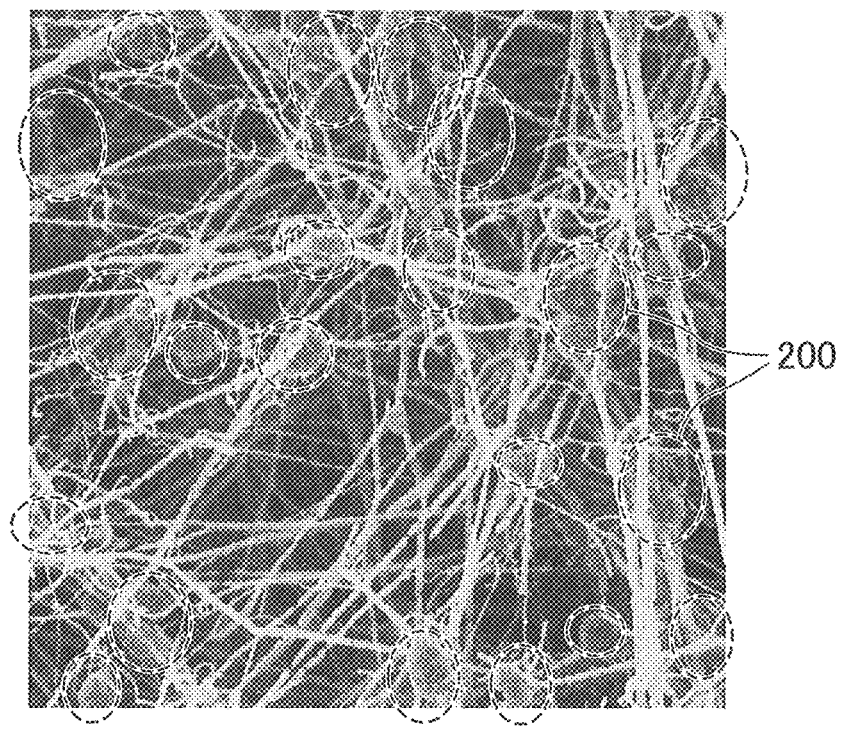
FIG. 13 is an image of a porous membrane obtained in Comparative Example 3 using a scanning electron microscope.
Figure 14:
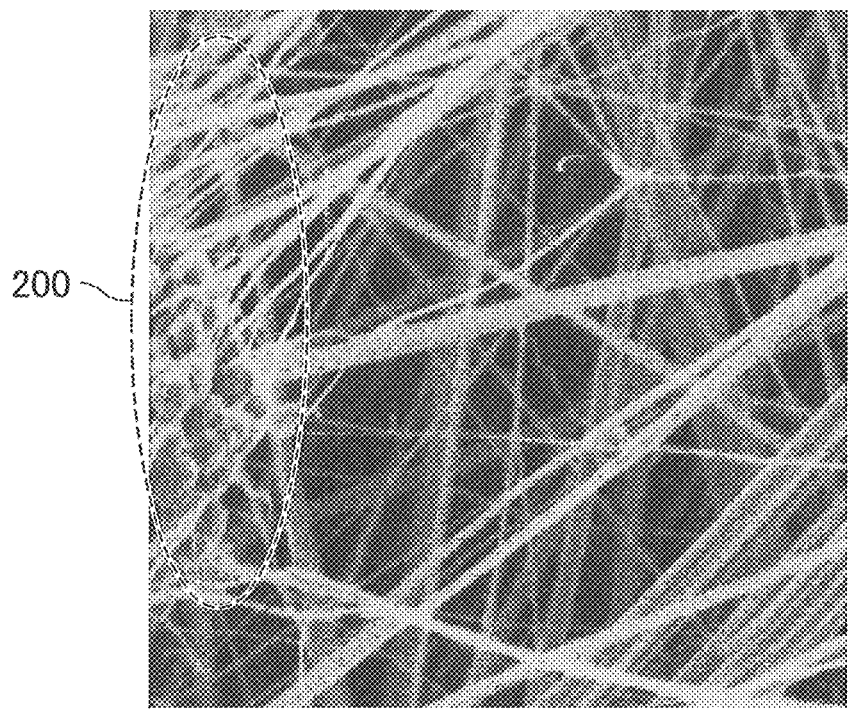
FIG. 14 is an image of a porous membrane obtained in Comparative Example 4 using a scanning electron microscope.

The uniaxially stretched unsintered film (uniaxially stretched film) was stretched in the width direction at a stretch ratio of 43 times using a tenter stretching machine illustrated in FIG. 4, and the film was heat-set (biaxial stretching). At this time, the stretching temperature was 295° C. and the heat-setting temperature was 340° C.

The appearance of the resulting porous membrane (biaxially stretched film) was evaluated. The criteria for evaluating the appearance of the biaxially stretched film are as follows.

Excellent: uniform

Good: uniform (but partially non-uniform)

Acceptable: largely non-uniform

Poor: with defects such as partial breakage or cracking

Very poor: breakage on the whole

The physical properties of the resulting porous membrane (biaxially stretched film) were evaluated. Table 2 shows the results.

Examples 2 to 6 and Comparative Examples 1 to 4

A porous membrane (biaxially stretched film) was obtained by the same processing as in Example 1 except that the type of the PTFE material, the amount of the extrusion aid (hydrocarbon oil), the conditions for uniaxial stretching, and the conditions for biaxial stretching were changed to those shown in Table 2.

The respective physical properties were determined in the same manner as in Example 1. Table 2 shows the results.

TABLE 2

| | Parameter | Unit | Example 1 | Example 2 | Example 3 | Example 4 | Example 5 | Example 6 |
|---|---|---|---|---|---|---|---|---|
| Extrusion | PTFE material | — | PTFE-A | PTFE-A | PTFE-A | PTFE-D | PTFE-E | PTFE-F |
| | Extrusion aid | Parts by weight | 24 | 24 | 26 | 24 | 24 | 24 |
| | Extusion pressure | MPa | 17.5 | 17.5 | 14.9 | 15.7 | 15.1 | 16.7 |
| Rolling | Average thickness | μm | 300 | 300 | 300 | 300 | 300 | 300 |
| Uniaxial stretching | Stretch ratio | Times | 5 | 15 | 10 | 15 | 15 | 15 |
| | Stretching rate | %/sec | 40 | 40 | 40 | 40 | 40 | 40 |
| | Stretching temperature | ° C. | 300 | 300 | 300 | 300 | 300 | 300 |
| | Appearance of uniaxially stretched film | — | Good | Good | Good | Good | Good | Good |
| Biaxial stretching | Stretch ratio | Times | 43 | 43 | 43 | 43 | 43 | 43 |
| | Line speed | m/min | 10 | 10 | 10 | 10 | 10 | 10 |
| | Stretching temperature | ° C. | 295 | 295 | 380 | 295 | 295 | 295 |
| | Heat-setting temperature | ° C. | 340 | 340 | 390 | 340 | 340 | 340 |
| | Appearance of biaxially stretched film | — | Excellent | Good | Excellent | Good | Good | Good |
| | Grammage | g/m$^2$ | 4.08 | 1.06 | 3.18 | 3.06 | 3.11 | 0.79 |
| | Film density | g/cm$^3$ | 0.583 | 0.353 | 0.636 | 0.510 | 0.622 | 0.524 |
| | Film thickness | μm | 7.0 | 3.0 | 5.0 | 6.0 | 5.0 | 4.0 |
| | Matrix tensile strength (vertical) | MPa | 130 | 332 | 163 | 207 | 249 | 241 |
| | Matrix tensile strength (lateral) | MPa | 290 | 262 | 291 | 168 | 269 | 253 |
| | Product of Matrix tensile strengths (vertical × lateral) | $10^4 \times$ (Mpa)$^2$ | 3.76 | 8.70 | 4.76 | 3.48 | 6.70 | 6.10 |
| | Average pore size | μm | 0.122 | 0.156 | 0.183 | 0.287 | 0.267 | 0.255 |
| | Number of nodes | Nodes | 22 | 9 | 16 | 8 | 12 | 10 |
| | Number of fused points | Fused points | 12 | 13 | 10 | 6 | 17 | 15 |

TABLE 2-continued

|  | Parameter | Unit | Comparative Example 1 | Comparative Example 2 | Comparative Example 3 | Comparative Example 4 |
|---|---|---|---|---|---|---|
| Extrusion | PTFE material | — | PTFE-B | PTFE-B | FTFE-C | PTFE-G |
|  | Extrusion aid | Parts by weight | 26 | 26 | 26 | 24 |
|  | Extusion pressure | MPa | 11.5 | 11.5 | 18.2 | 4.3 |
| Rolling | Average thickness | μm | 300 | 300 | 300 | 300 |
| Uniaxial stretching | Stretch ratio | Times | 12 | 20 | 10 | 10 |
|  | Stretching rate | %/sec | 40 | 40 | 40 | 40 |
|  | Stretching temperature | °C. | 300 | 300 | 250 | 300 |
|  | Appearance of uniaxially stretched film | — | Good | Acceptable | Acceptable | Acceptable |
| Biaxial stretching | Stretch ratio | Times | 43 | 43 | 43 | 27 |
|  | Line speed | m/min | 10 | 10 | 10 | 15 |
|  | Stretching temperature | °C. | 295 | 295 | 295 | 295 |
|  | Heat-setting temperature | °C. | 340 | 340 | 340 | 340 |
|  | Appearance of biaxially stretched film | — | Excellent | Acceptable | Acceptable | Acceptable or Poor |
|  | Grammage | g/m$^2$ | 2.71 | 0.80 | 2.33 | 0.48 |
|  | Film density | g/cm$^3$ | 0.511 | 1.333 | 0.466 | 0.048 |
|  | Film thickness | μm | 5.3 | 0.6 | 5.0 | 10.0 |
|  | Matrix tensile strength (vertical) | MPa | 104 | 180 | 139 | 25 |
|  | Matrix tensile strength (lateral) | MPa | 147 | 90 | 148 | 59 |
|  | Product of Matrix tensile strengths (vertical × lateral) | $10^4 \times$ (Mpa)$^2$ | 1.52 | 1.62 | 2.05 | 0.15 |
|  | Average pore size | μm | 0.414 | 0.211 | 0.164 | 2.50 |
|  | Number of nodes | Nodes | 6 | 9 | 22 | 1 |
|  | Number of fused points | Fused points | 0 | 0 | 0 | 0 |

For the respective porous membranes (biaxially stretched membranes) obtained in Examples 1 and 2 and Comparative Examples 1 and 4, the average fiber diameter, the number of fibers, and the fiber filling index were determined. Table 3 shows the results.

TABLE 3

|  | Parameter | Unit | Example 1 | Example 2 | Comparative Example 1 | Comparative Example 4 |
|---|---|---|---|---|---|---|
| Biaxial stretching | Average fiber diameter | nm | 48 | 40 | 65 | 70 |
|  | Number of fibers | Fibers/10 μm | 81 | 96 | 54 | 51 |
|  | Fiber filling index |  | 4565 | 4717 | 3675 | 3825 |

INDUSTRIAL APPLICABILITY

The porous body of the present invention can be suitably used as, for example, a filter material for filters, a porous hollow fiber, a porous fiber, and a support member for polymer electrolyte membranes.

REFERENCE SIGNS LIST

1: Feeding roll for rolled film
2, 18: Take-up roll
3, 4, 5, 8, 9, 10, 11, 12: Roll
6, 7: Heat roll
13: Feeding roll for longitudinally stretched film
14: Pre-heating zone
15: Stretching zone
16: Heat-setting zone
17: Lamination roll
100: Fused point
200: Node
300: Fibril

The invention claimed is:

1. A porous body comprising polytetrafluoroethylene and having a microstructure that includes nodes and fibrils,
   the microstructure further including, in addition to the nodes and the fibrils, fused points where one fibril that links two nodes and another fibril that links another two nodes are fused with each other,
   wherein the one fibril and the another fibril fused with each other have a diameter difference of 10% or lower and a deviation from a straight line of within ±10° across the fused point, and
   wherein the fused points are formed by fusion of at least two 3-dimensionally crossing fibrils at their crossing point, wherein the polytetrafluoroethylene is obtained by copolymerizing tetrafluoroethylene and a trace comonomer.

2. The porous body according to claim 1,
wherein the microstructure includes five or more fused points within an area of 5 µm×5 µm observed in an electron microscopic image taken using a scanning electron microscope at a magnification of 10000×.

3. The porous body according to claim 1,
wherein the trace comonomer at least comprises perfluoro (methyl vinyl ether).

4. The porous body according to claim 3,
wherein the polytetrafluoroethylene comprises 0.011 mol % or more of a polymer unit derived from perfluoro (methyl vinyl ether) in all the monomer units.

5. The porous body according to claim 1, which is a porous membrane.

6. The porous body according to claim 1, which is obtained by biaxial stretching.

7. A filter material for filters, comprising
the porous body according to claim 1.

8. A filter unit comprising
the filter material for filters according to claim 7 and a frame that holds the filter material for filters.

9. A polymer electrolyte membrane comprising
the porous body according to claim 1.

10. The porous body according to claim 1, which is a porous hollow fiber.

11. The porous body according to claim 1, which is a porous fiber.

\* \* \* \* \*